US011517401B2

(12) United States Patent
Raby et al.

(10) Patent No.: US 11,517,401 B2
(45) Date of Patent: Dec. 6, 2022

(54) REMOVABLE DENTAL APPLIANCE INCLUDING SPRING BELLOWS

(71) Applicant: 3M INNOVATIVE PROPERTIES COMPANY, St. Paul, MN (US)

(72) Inventors: Richard E. Raby, Lino Lakes, MN (US); Chaodi Li, Woodbury, MN (US); Michael K. Domroese, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 361 days.

(21) Appl. No.: 16/753,554

(22) PCT Filed: Sep. 18, 2018

(86) PCT No.: PCT/IB2018/057159
§ 371 (c)(1),
(2) Date: Apr. 3, 2020

(87) PCT Pub. No.: WO2019/069162
PCT Pub. Date: Apr. 11, 2019

(65) Prior Publication Data
US 2020/0289239 A1 Sep. 17, 2020

Related U.S. Application Data

(60) Provisional application No. 62/568,982, filed on Oct. 6, 2017.

(51) Int. Cl.
*A61C 7/08* (2006.01)
*B33Y 50/00* (2015.01)
(Continued)

(52) U.S. Cl.
CPC ............... *A61C 7/08* (2013.01); *A61C 7/002* (2013.01); *B29C 64/386* (2017.08); *B33Y 50/00* (2014.12);
(Continued)

(58) Field of Classification Search
CPC .... A61C 7/08; A61C 7/00; A61C 7/02; B33Y 50/00; B33Y 80/00; B29C 64/386; B29L 2031/753
See application file for complete search history.

(56) References Cited

U.S. PATENT DOCUMENTS 5,312,247 A 5/1994 Sachdeva
6,488,499 B1 * 12/2002 Miller ...................... A61C 7/08
433/24

(Continued)

FOREIGN PATENT DOCUMENTS

JP 2003038520 2/2003
JP 2011212132 10/2011
(Continued)

OTHER PUBLICATIONS

International Search Report for PCT International Application No. PCT/IB2018/057159, dated Feb. 20, 2019, 7 pages.

*Primary Examiner* — Ronald D Hartman, Jr.

(57) ABSTRACT

A removable dental appliance may include an appliance body at least partially surrounding two or more teeth of a patient. The appliance body may include a first shell shaped to receive a first tooth; a second shell shaped to receive a second tooth; and at least one spring bellows that includes an arcuate displacement extending over and away from at least a portion of an interproximal region between the first tooth and the second tooth to join the first shell and the second shell. The spring bellows is configured to apply a force between the first shell and the second shell to cause move-
(Continued)

ment of at least one of the first tooth and the second tooth toward a desired position when the removable dental appliance is worn by the patient.

20 Claims, 17 Drawing Sheets

(51) Int. Cl.
  *B33Y 80/00* (2015.01)
  *B29C 64/386* (2017.01)
  *A61C 7/00* (2006.01)
  *B29L 31/00* (2006.01)
(52) U.S. Cl.
  CPC ......... *B33Y 80/00* (2014.12); *B29L 2031/753* (2013.01)

(56) References Cited

U.S. PATENT DOCUMENTS

| | | |
|---|---|---|
| 6,572,372 B1 | 6/2003 | Phan |
| 6,845,175 B2 | 1/2005 | Kopelman |
| 7,011,518 B2 | 3/2006 | DeLuke |
| 7,027,642 B2 | 4/2006 | Rubbert |
| 7,234,937 B2 | 6/2007 | Sachdeva |
| 7,731,495 B2 | 6/2010 | Eisenberg |
| 8,194,067 B2 | 6/2012 | Raby |
| 8,491,306 B2 | 7/2013 | Raby |
| 8,651,857 B2 | 2/2014 | Geenty |
| 8,738,165 B2 | 5/2014 | Cinader, Jr. |
| 9,345,557 B2 | 5/2016 | Anderson |
| 9,532,854 B2 | 1/2017 | Cinader, Jr. |
| 2004/0009449 A1 | 1/2004 | Mah |
| 2004/0013996 A1* | 1/2004 | Sapian ..................... A61C 7/10 433/7 |
| 2004/0029068 A1 | 2/2004 | Sachdeva |
| 2006/0093983 A1 | 5/2006 | Schultz |
| 2007/0031791 A1 | 2/2007 | Cinader, Jr. |
| 2007/0065768 A1 | 3/2007 | Nadav |
| 2008/0020337 A1 | 1/2008 | Phan |
| 2009/0098500 A1 | 4/2009 | Diaz Rendon |
| 2009/0148803 A1 | 6/2009 | Kuo |
| 2012/0150494 A1* | 6/2012 | Anderson ................ A61C 7/08 703/1 |
| 2013/0029283 A1* | 1/2013 | Matty ...................... A61C 7/08 700/98 |
| 2013/0122448 A1* | 5/2013 | Kitching .................. A61C 7/08 433/24 |
| 2013/0325431 A1 | 12/2013 | See |
| 2014/0363779 A1 | 12/2014 | Kopelman |
| 2015/0140501 A1 | 5/2015 | Kim |
| 2015/0157421 A1 | 6/2015 | Martz |
| 2015/0216627 A1 | 8/2015 | Kopelman |
| 2016/0067014 A1 | 3/2016 | Kottemann |
| 2016/0128803 A1 | 5/2016 | Webber et al. |
| 2016/0193014 A1 | 7/2016 | Morton |
| 2016/0310236 A1 | 10/2016 | Kopelman |
| 2017/0007366 A1 | 1/2017 | Kopelman |
| 2017/0065373 A1 | 3/2017 | Martz |
| 2017/0367792 A1* | 12/2017 | Raby ..................... A61C 7/002 |
| 2018/0271620 A1 | 9/2018 | Rodriguez ............... A61C 7/14 |
| 2019/0388190 A1* | 12/2019 | Hung ..................... A61C 7/08 |
| 2020/0261187 A1* | 8/2020 | Simonetti ............... A61F 5/566 |

FOREIGN PATENT DOCUMENTS

| | | | |
|---|---|---|---|
| KR | 200465679 | 3/2013 | |
| KR | 1020150119597 | 10/2015 | |
| KR | 1020170071155 | 6/2017 | |
| WO | WO 2006-096558 | 9/2006 | |
| WO | WO 2007-084727 | 7/2007 | |
| WO | WO 2014-128423 | 8/2014 | |
| WO | WO 2015-114450 | 8/2015 | |
| WO | WO 2015-140614 | 9/2015 | |
| WO | WO-2015140614 A1 * | 9/2015 | ............ A61C 7/08 |
| WO | WO 2019-023166 | 1/2019 | |
| WO | WO 2019-069163 | 4/2019 | |
| WO | WO 2019-069164 | 4/2019 | |
| WO | WO 2019-069165 | 4/2019 | |
| WO | WO 2019-069166 | 4/2019 | |
| WO | WO 2019-069268 | 4/2019 | |

* cited by examiner

REMOVABLE DENTAL APPLIANCE INCLUDING SPRING BELLOWS

CROSS REFERENCE TO RELATED APPLICATIONS

This application is a national stage filing under 35 U.S.C. 371 of PCT/IB2018/057159, filed Sep. 18, 2018, which claims the benefit of provisional Application No. 62/568,982, filed Oct. 6, 2017, the disclosure of which is incorporated by reference in its/their entirety herein.

TECHNICAL FIELD

This disclosure relates to polymer-based removable dental appliances such as tooth aligners.

BACKGROUND

The field of orthodontics relates to repositioning a patient's teeth for improved function and aesthetic appearance. Orthodontic devices and treatment methods generally involve the application of forces to move teeth into a proper bite configuration, or occlusion. As one example, orthodontic treatment may involve the use of slotted appliances, known as brackets, which are fixed to the patient's anterior, cuspid, and bicuspid teeth. An archwire is typically placed in the slot of each bracket and serves as a track to guide movement of the teeth to desired orientations. The ends of the archwire are usually received in appliances known as buccal tubes that are secured to the patient's molar teeth. Such dental appliances remain in the mouth of the patient and are periodically adjusted by an orthodontist to check the process and maintain the proper force on the teeth until proper alignment is achieved.

Orthodontic treatment may also involve the use of alignment trays, such as clear or transparent, polymer-based tooth positioning trays, often referred to as clear tray aligners (CTAs). For example, orthodontic treatment with CTAs may include forming a tray having shells that engage one or more teeth. Each shell may be deformed from an initial position of a tooth, e.g., a malocclusion position. The deformed position of a respective shell of the CTA may apply a force to a respective tooth toward a desired position for the tooth that is an intermediate position between the initial position and a final position resulting from the orthodontic treatment.

SUMMARY

In some examples, the disclosure describes a removable dental appliance including an appliance body configured to at least partially surround two or more teeth of a patient. The appliance body includes a first shell shaped to receive a first tooth of the patient; a second shell shaped to receive a second tooth of the patient; and at least one spring bellows. The at least one spring bellows includes an arcuate displacement of the appliance body extending over and away from at least a portion of an interproximal region between the first tooth and the second tooth to join the first shell and the second shell. The at least one spring bellows is configured to apply a force between the first shell and the second shell to cause movement of at least one of the first tooth and the second tooth toward a desired position when the removable dental appliance is worn by the patient.

In some examples, the disclosure describes a system that includes an ordered set of removable dental appliances configured to reposition one or more teeth of a patient. Each removable dental appliance in the set of removable dental appliances includes an appliance body configured to at least partially surround two or more teeth of the patient. The appliance body includes a first shell shaped to receive a first tooth of the patient; a second shell shaped to receive a second tooth of the patient; and at least one spring bellows. The at least one spring bellows includes an arcuate displacement of the appliance body extending over and away from at least a portion of an interproximal region between the first tooth and the second tooth to join the first shell and the second shell. The at least one spring bellows is configured to apply a force between the first shell and the second shell to cause movement of at least one of the first tooth and the second tooth toward a desired position when the removable dental appliance is worn by the patient.

In some examples, the disclosure describes a method that includes forming a model of dental anatomy of a patient; and forming, based on the model, a removable dental appliance. The removable dental appliance includes an appliance body configured to at least partially surround two or more teeth of the patient. The appliance body includes a first shell shaped to receive a first tooth of the patient; a second shell shaped to receive a second tooth of the patient; and at least one spring bellows. The at least one spring bellows includes an arcuate displacement of the appliance body extending over and away from at least a portion of an interproximal region between the first tooth and the second tooth to join the first shell and the second shell. The at least one spring bellows is configured to apply a force between the first shell and the second shell to cause movement of at least one of the first tooth and the second tooth toward a desired position when the removable dental appliance is worn by the patient.

In some examples, the disclosure describes a method that includes receiving, by a computing device, a digital representation of a three-dimensional (3D) dental anatomy of a patient providing initial positions of one or more teeth of the patient. The method also includes determining, by the computing device, dimensions and shapes of a removable dental appliance for the patient. The removable dental appliance includes an appliance body configured to at least partially surround two or more teeth of the patient. The dimensions and shapes of the removable dental appliance are configured to reposition the one or more teeth of the patient from initial positions to desired positions when the removable dental appliance is worn by the patient. The dimensions and shapes of the removable dental appliance include positions, dimensions, and shapes of at least one of a first shell shaped to receive a first tooth of the patient; a second shell shaped to receive a second tooth of the patient; and at least one spring bellows. The at least one spring bellows includes an arcuate displacement of the appliance body extending over and away from at least a portion of an interproximal region between the first tooth and the second tooth to join the first shell and the second shell. The at least one spring bellows is configured to apply a force between the first shell and the second shell to cause movement of at least one of the first tooth and the second tooth toward a desired position when the removable dental appliance is worn by the patient. The method also includes transmitting, by the computing device, a representation of the removable dental appliance to a computer-aided manufacturing system.

In some examples, the disclosure describes a non-transitory computer-readable storage medium that stores computer system-executable instructions that, when executed, configure a processor to receive, by a computing device, a digital representation of a three-dimensional (3D) dental anatomy of a patient providing initial positions of one or more teeth of the patient. The non-transitory computer-readable storage medium also stores computer system-executable instructions that, when executed, configure a processor to determine, by the computing device, dimensions and shapes of a removable dental appliance for the patient. The removable dental appliance includes an appliance body configured to at least partially surround two or more teeth of the patient. The dimensions and shapes of the removable dental appliance are configured to reposition the one or more teeth of the patient from initial positions to desired positions when the removable dental appliance is worn by the patient. The dimensions and shapes of the removable dental appliance include positions, dimensions, and shapes of at least one of a first shell shaped to receive a first tooth of the patient; a second shell shaped to receive a second tooth of the patient; and at least one spring bellows. The at least one spring bellows includes an arcuate displacement of the appliance body extending over and away from at least a portion of an interproximal region between the first tooth and the second tooth to join the first shell and the second shell. The at least one spring bellows is configured to apply a force between the first shell and the second shell to cause movement of at least one of the first tooth and the second tooth toward a desired position when the removable dental appliance is worn by the patient. The non-transitory computer-readable storage medium also stores computer system-executable instructions that, when executed, configure a processor to transmit, by the computing device, a representation of the removable dental appliance to a computer-aided manufacturing system.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1A:
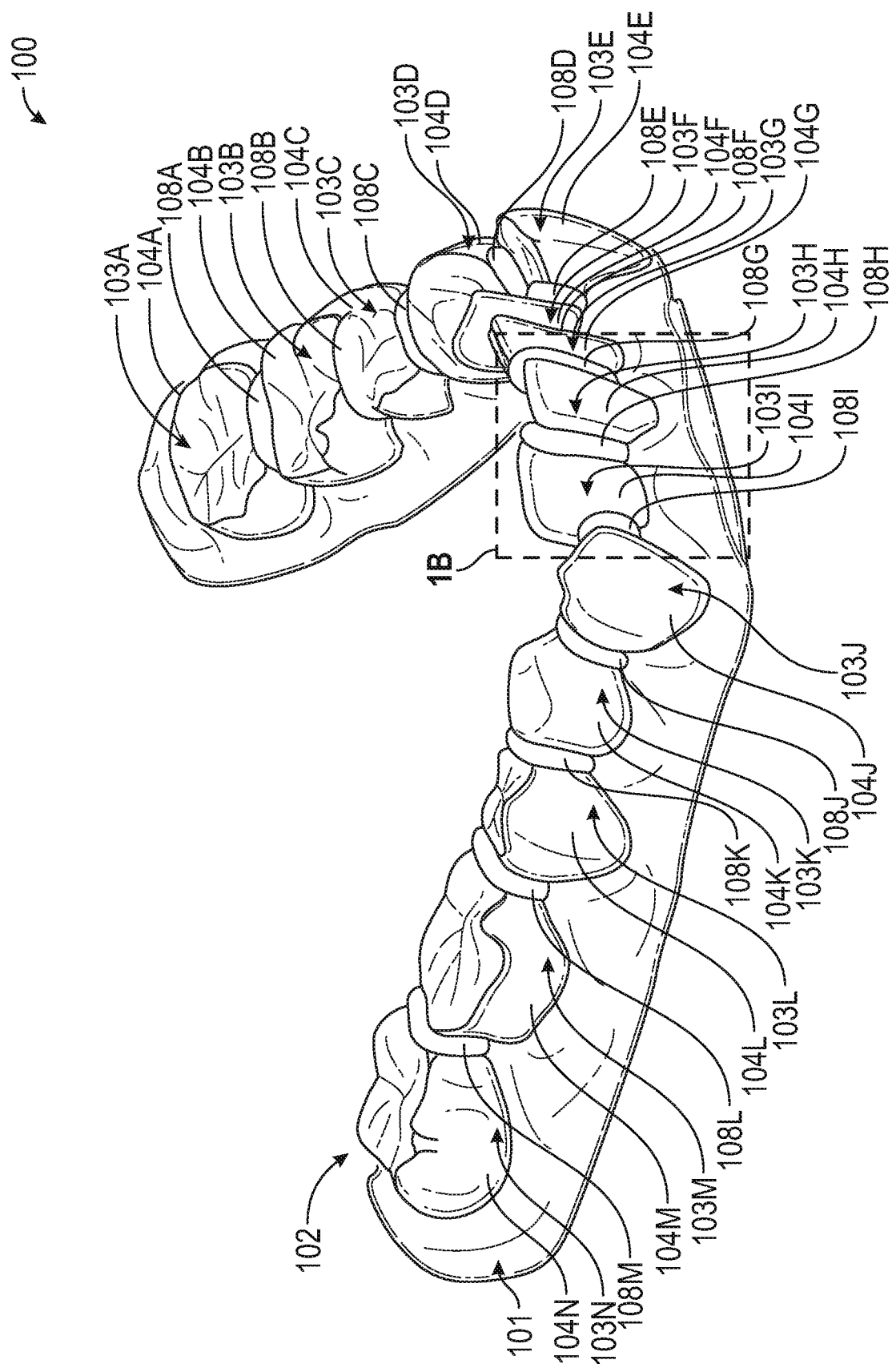
FIGS. 1A and 1B illustrate an oblique view of an example removable dental appliance that includes a plurality of spring bellows configured to apply forces to cause movement of the teeth of a patient toward a desired position.

This disclosure describes removable dental appliances that include at least one spring bellows. Orthodontic treatment with the removable dental appliances described in this disclosure may include the use of at least one spring bellows between adjacent shells to enable greater control of force vectors and directional magnitudes applied to the teeth of the patient. A spring bellows may extend over an interproximal region between a first tooth and a second tooth to join adjacent shells, e.g., a first shell and a second shell that receive the first tooth and the second tooth, respectively. During use of the removable dental appliance, insertion of the removable dental appliance in the mouth of a patient may result in at least some of the removable dental appliance being deformed, e.g., from a physical configuration in which the removable dental appliance was formed to a configuration in which teeth of the patient are received in shells of the removable dental appliance. The deformation of the removable dental appliance may be concentrated in the spring bellows. For example, the spring bellows may deform more than the first shell, the second shell, or both. The deformation may result in a force being created in the spring bellows, such as, for example, compression, tension, shear, bending, or torsion forces. The force may be a restorative force causing the spring bellows to urge the first shell, the second shell, or both in one or more directions that would result in the spring bellows becoming less deformed. The force on the shells may result in force vectors on one or more teeth of the patient. In this way, the removable dental appliance including spring bellows may be configured to apply a force to move the teeth of a patient.

By concentrating the deformation of the removable dental appliance in the spring bellows, a respective shell may remain more highly engaged with a respective tooth, e.g., such that more points of the respective shell contacts a respective tooth, a greater surface area of the respective shells contacts a respective tooth, or the like, when the removable dental appliance is worn by the patient, compared to removable dental appliances without a spring bellows. For example, a respective shell of a removable dental appliance without spring bellows both engages a respective tooth and creates the force required to move the tooth during the course of orthodontic treatment. However, the degree of tooth engagement (e.g., the amount and positions of shell/tooth contact) may affect control of the force applied to the tooth. For example, a removable dental appliance without spring bellows may provide reduced control compared to a removable dental appliance with spring bellows due to adverse (e.g., undesirable or indeterminate) deformation of the shells that may result in indeterminate engagement of the shells and teeth. The undesired deformation of the shells and indeterminate engagement of the shells and teeth may result in forces being applied to the teeth in one or more indeterminate directions with indeterminate magnitudes. By decoupling engagement of teeth from application of the force to the teeth, the disclosed removable dental appliance improves engagement of teeth in the shells by reducing adverse deformation of the shells and concentrates deformation in the spring bellows without resulting in unpredictable contact points on the teeth. In this way, by separating the force generating member (the spring bellows) and the engagement member (the shells), the removable dental appliances may allow greater control of forces applied to teeth.

In some examples, the spring bellows may be configured to control the magnitude, direction, and length of expression of the force applied to a respective shell and the resulting force applied to the respective tooth. For example, the spring bellows may be positioned and shaped to provide a selected force in a selected direction to at least one shell. The force on the respective shell may result in a desired force vector on the respective tooth. For example, the force vector may be applied to the shell in a direction, a magnitude, or both that may not be possible to apply to the shell without the spring bellows. Likewise, the force vector may be applied to the shell with a degree of certainty that might not be possible otherwise. The spring bellows may also enable expression of a force over a greater distance. For example, arcuate displacement of the spring bellows may be longer than an interproximal region between adjacent teeth. The length of the arcuate displacement may allow the spring bellows to express a force as the arcuate displacement extends, recoils, or otherwise reacts to at least one of a compression, tension, shear, bending, or torsion. The force may be expressed until the arcuate displacement reacts to the extent that the stored compression, tension, shear, bending, or torsion is insufficient to move the teeth. For example, movement of a tooth may cease when the force resulting from the compression, tension, shear, bending, or torsion in the spring bellows is less than a force necessary to result in alveolar bone remodeling. In this way, the removable dental appliance may improve control of at least one of force vector direction, magnitude, or expression length, to achieve at least one of a desired tooth movement that may not be possible without spring bellows, a desired tooth movement over a shortened treatment time, a desired tooth movement with fewer progressions of removable dental appliances in a set of removable dental appliances, or the like, compared to other orthodontic treatments.

Figure 1B:
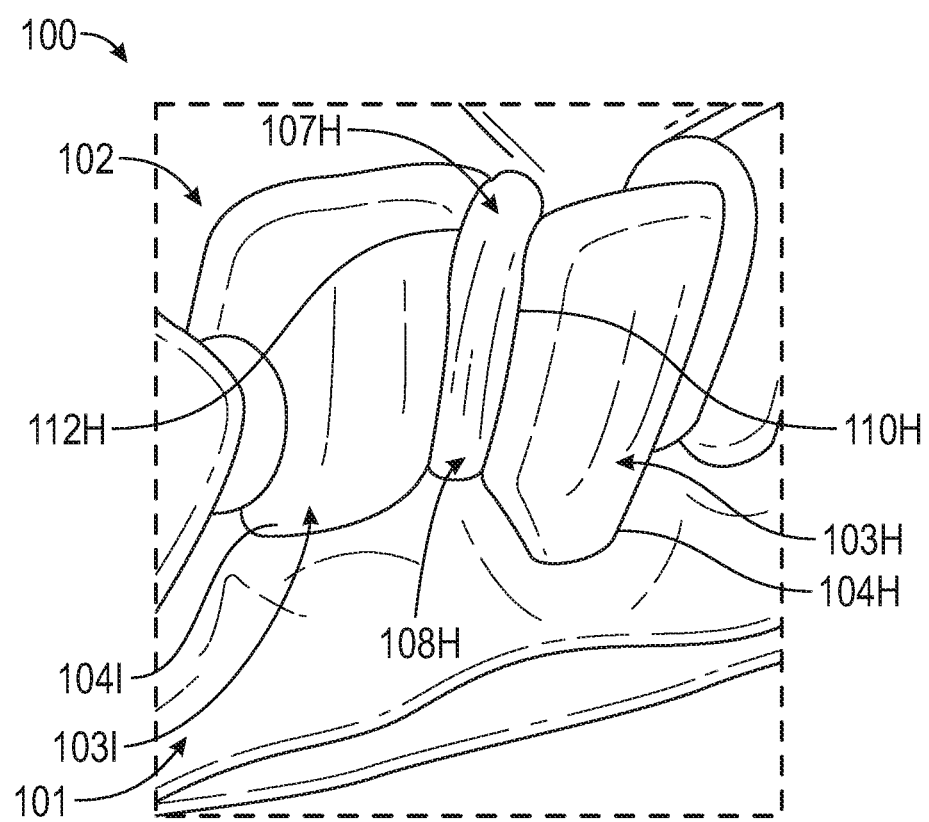
Figure 2A:
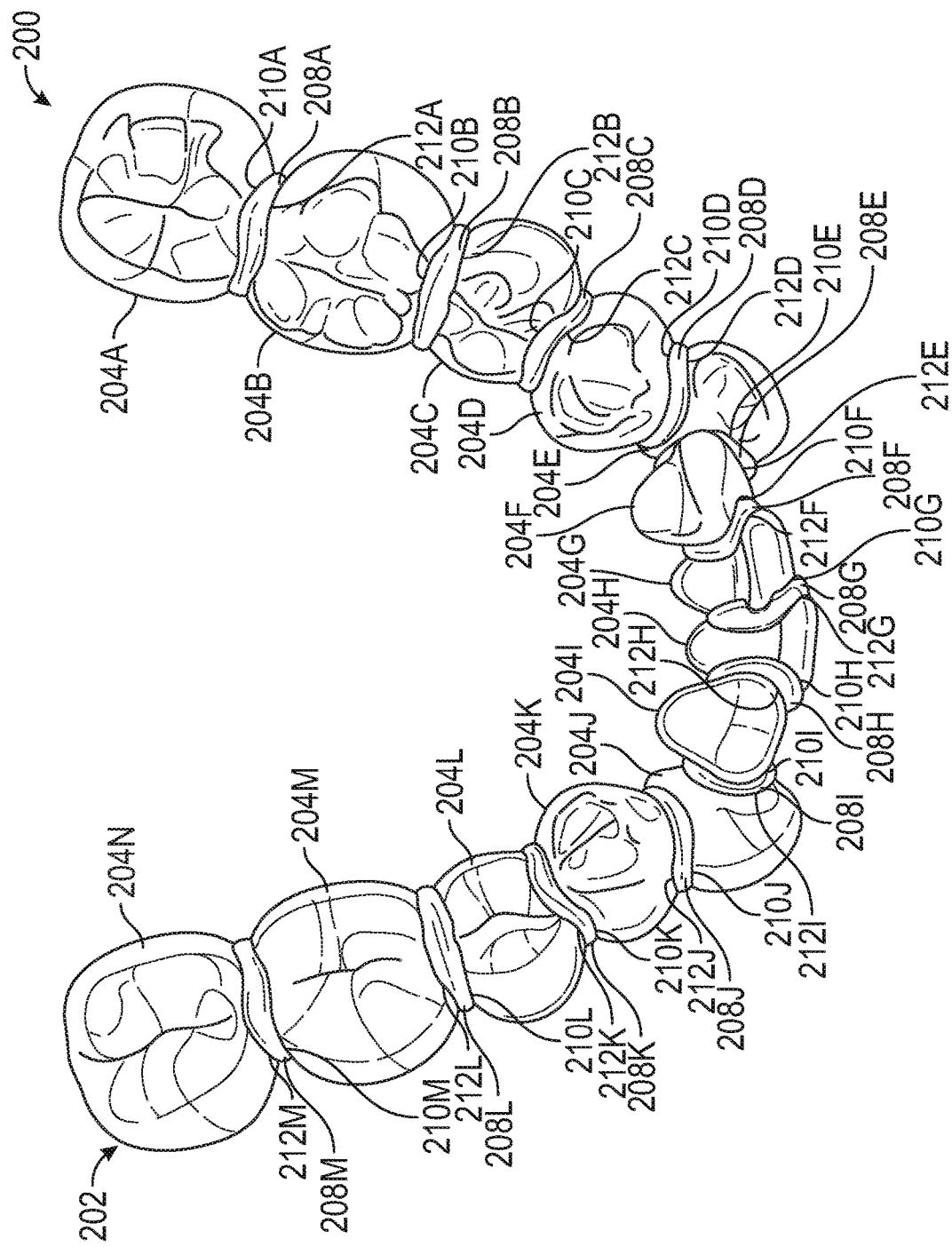
FIGS. 2A-2I illustrate different views of an example removable dental appliance that includes a plurality of spring bellows.
Figure 2B:
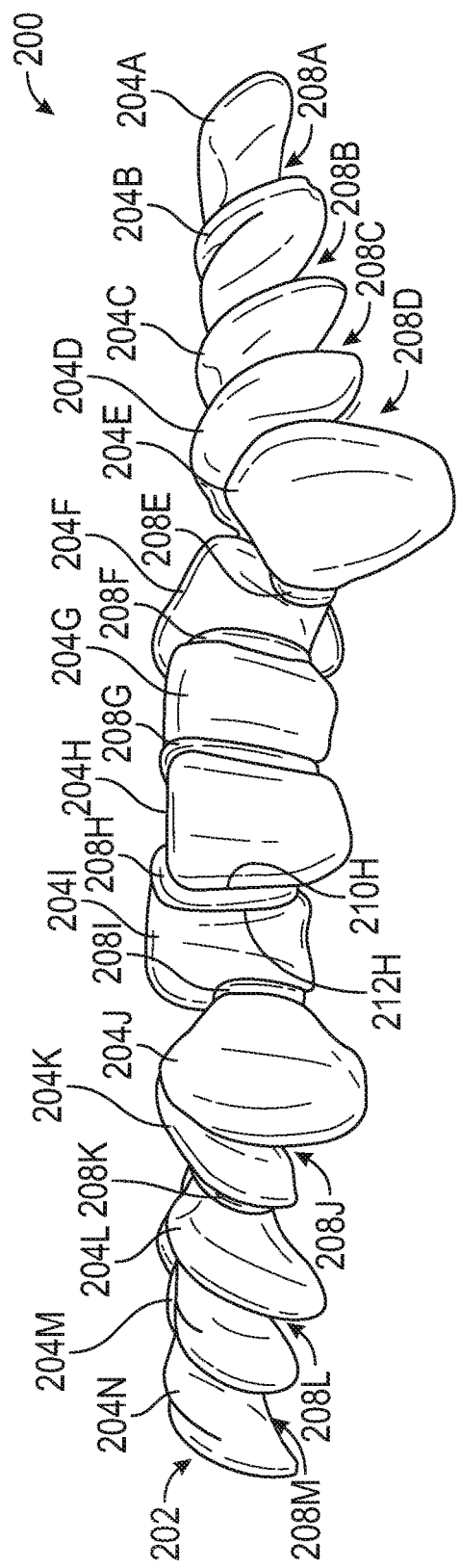
Figure 2C:
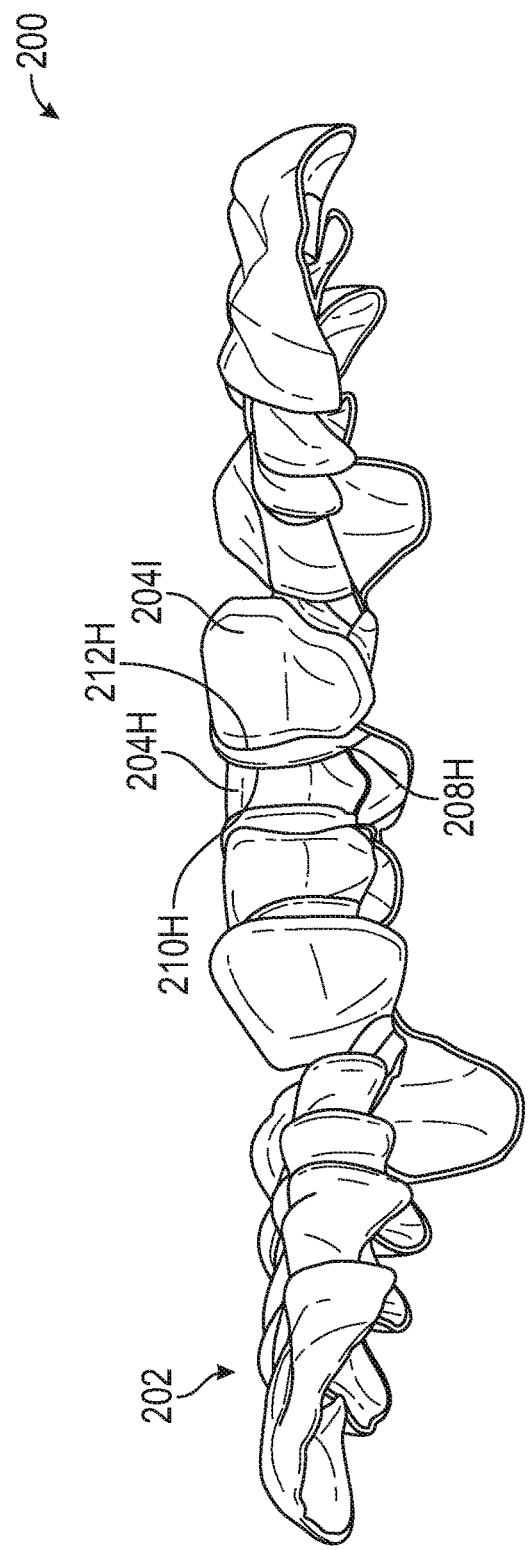
Figure 2D:
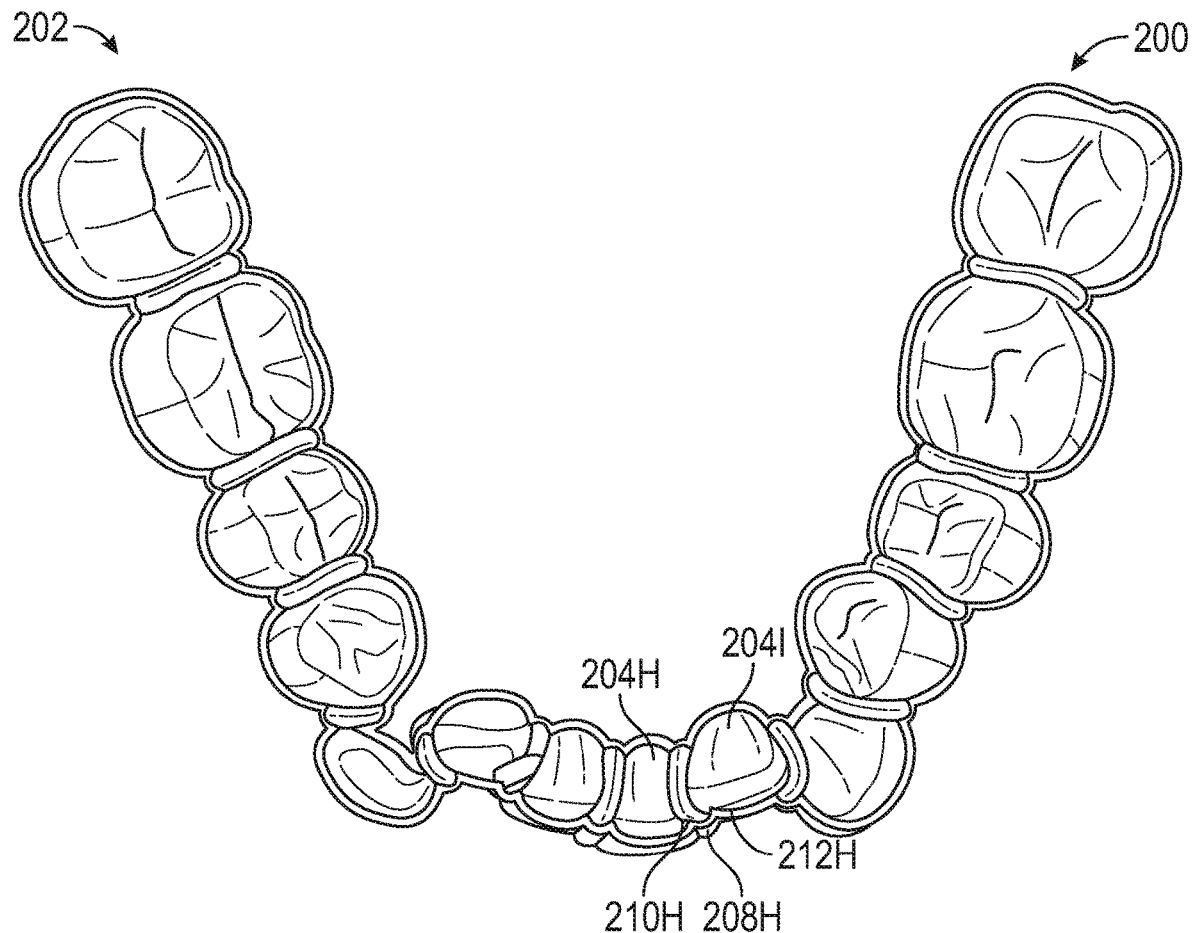
Figure 2E:
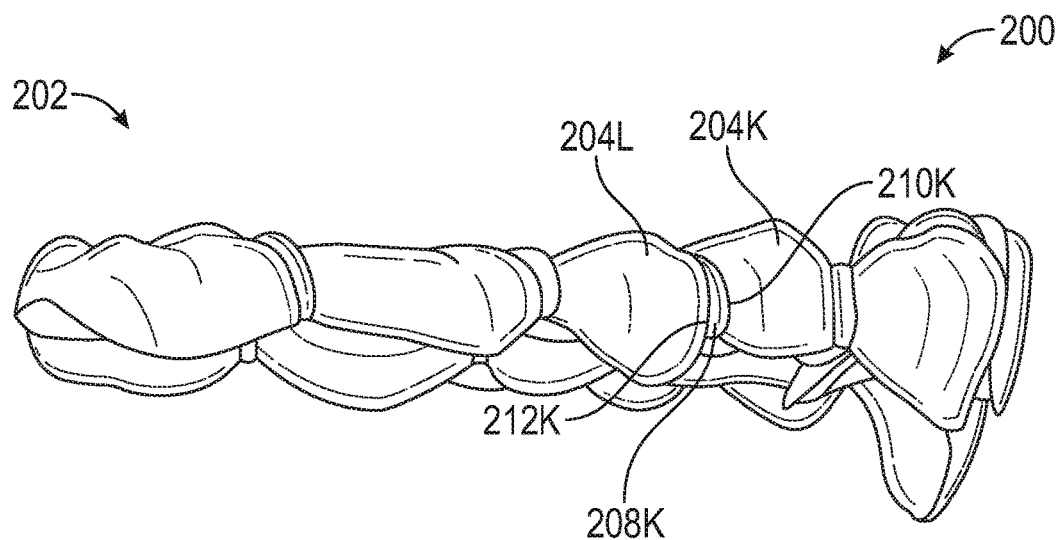
Figure 2F:
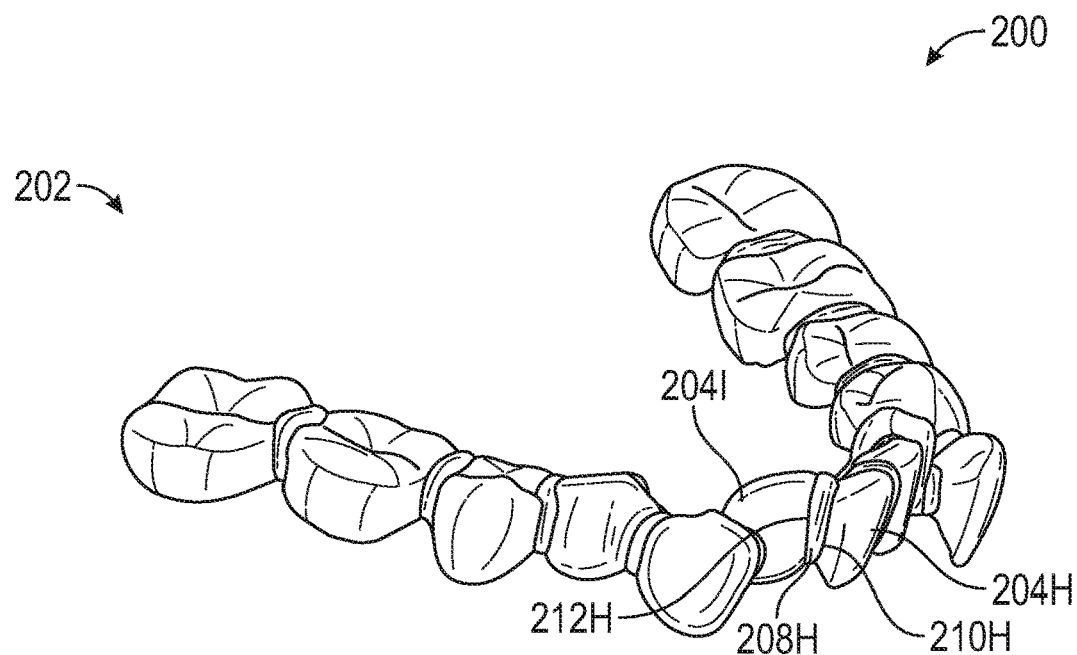
Figure 2G:
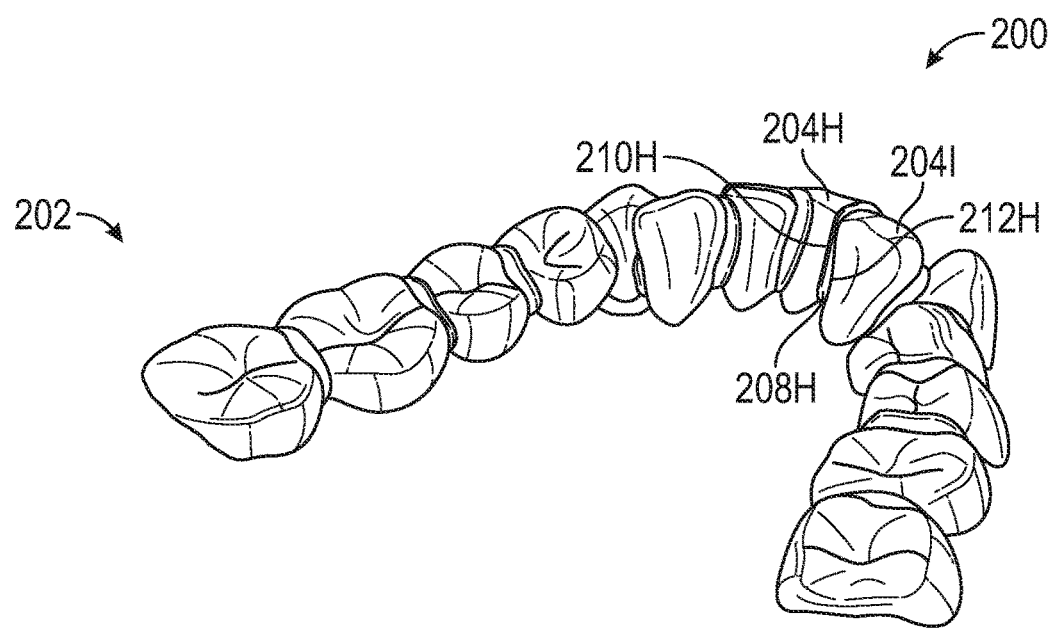
Figure 2H:
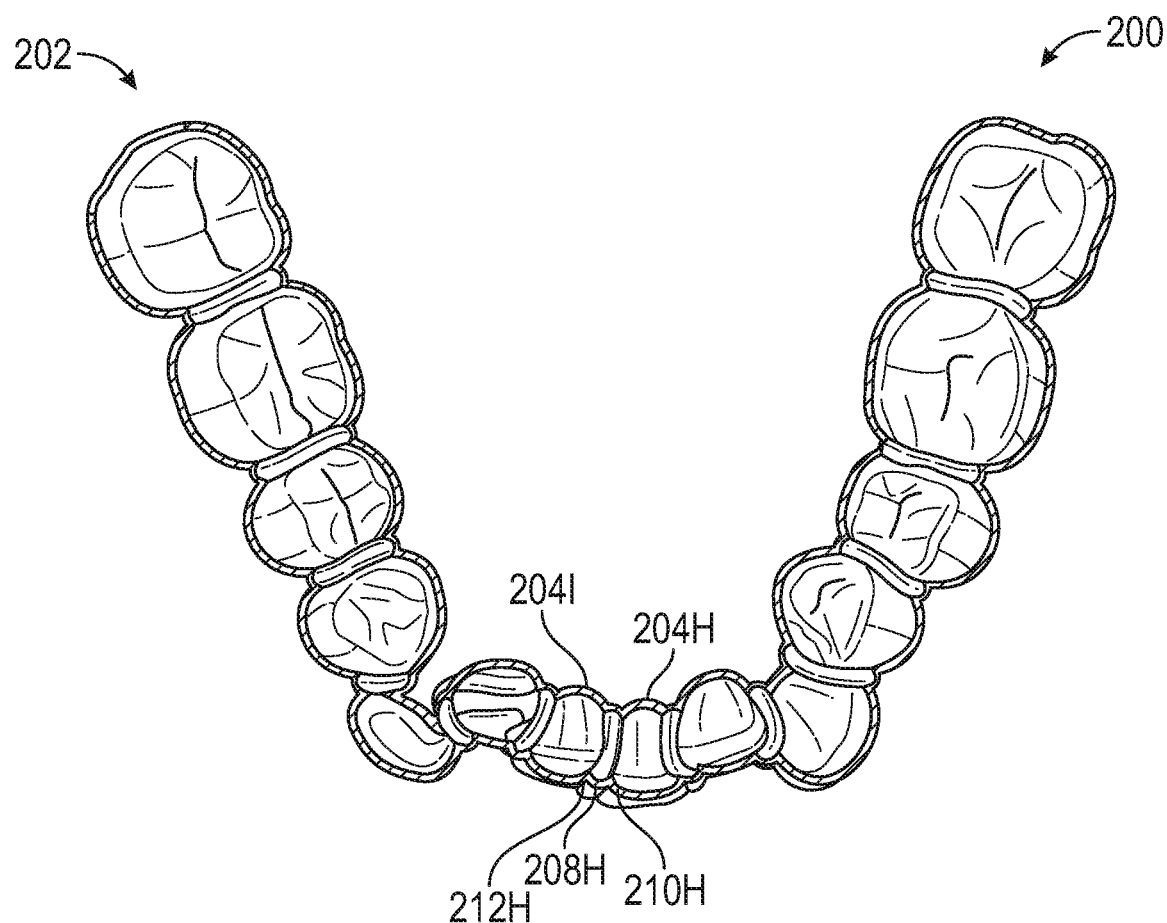
Figure 2I:
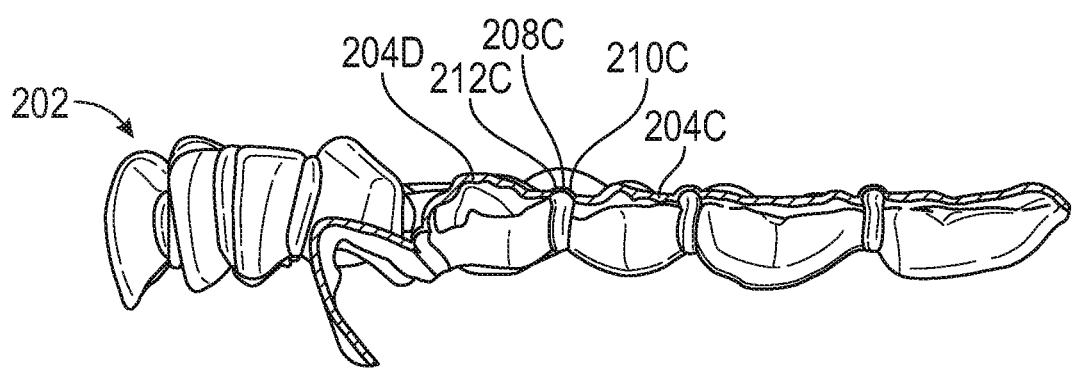

FIGS. 1A and 1B illustrate an oblique facial view of an example removable dental appliance 100 engaged with teeth 103A-103N (collectively, "teeth 103") of the mandibular arch 101 of a patient. The number of teeth 103 may be less than fourteen, e.g., a patient having one or more extracted teeth, or more than fourteen, e.g., a patient having wisdom teeth or hyperdontia. Removable dental appliance 100 may include an aligner tray. For example, removable dental appliance 100 includes an appliance body 102 including a plurality of shells 104A-104N (collectively, "shells 104") and a plurality of spring bellows 108A-108M (collectively, "spring bellows 108"). For purposes of illustration, only a first shell 104H, a second shell 104I, and a (single) spring bellows 108H are labeled in FIG. 1B, although appliance body 102 defines fourteen shells (one for each tooth) and thirteen spring bellows (one spring bellows between each pair of adjacent shells). For example, spring bellows 108 may be configured to apply a force between two respective shells of shells 104 to cause movement of at least one respective tooth of teeth 103 toward a desired position. For example, spring bellows 108H may be configured to apply a force between first and second shells 104H and 104I to cause movement of at least one of first and second tooth 103H and 103I toward a desired position. In this way, removable dental appliance 100 may improve control of at least one of force vector direction, magnitude, or expression length, to achieve at least one of a desired tooth movement that may not be possible without spring bellows 108, a desired tooth movement over a shortened treatment time, a desired tooth movement with fewer progressions of removable dental appliances in a set of removable dental appliances, or the like, compared to other orthodontic treatments.

Appliance body 102 may be configured to at least partially surround two or more teeth 103 of either the maxillary dental arch or, as shown in FIG. 1, the mandibular dental arch 101 of a patient. For example, appliance body 102 may surround at least one of the facial, lingual, and occlusal surfaces of teeth 103, overlap a portion of the gingiva of the patient, or the like. In some examples, appliance body 102 may surround different portions of different teeth 103.

Appliance body 102 includes shells 104, and each respective shell of shells 104 is shaped to receive at least one respective tooth of teeth 103. For example, a respective shell of shells 104 may be shaped to contact at least one selected location, a selected surface area, or both of a respective tooth of teeth 103. For example, first shell 104H may be shaped to receive first tooth 103H and second shell 104I shaped to receive second tooth 103I. In some examples, appliance body 102 may define a respective shell of shells 104 for each respective tooth of teeth 103. In other examples, appliance body 102 may define fewer shells than teeth, e.g., a shell may receive more than one tooth or at least one of teeth 103 may not be surrounded by a shell of shells 104. In other examples, appliance body 102 may define more shells 104 than teeth 103, e.g., two or more shells or shell-like portions may surround at least a portion of at least one tooth or a shell in place to receive an unerupted tooth.

In some examples, shells 104 may surround the facial, lingual, and occlusal portions of teeth 103. In other examples, shells 104 may surround fewer portions of teeth 103, such as, for example, only the facial and lingual portions, or only one or the facial or lingual portions of teeth 103. By selecting the shape of a respective shell of shells 104, removable dental appliance 101 may control the locations of a force applied to a respective tooth of teeth 103. In some examples, a thickness of a respective shell of shells 104 may range between about 0.10 millimeters and about 2.0 millimeters, such as between about 0.2 and about 1.0 millimeters, or between 0.30 millimeters and 0.75 millimeters.

Appliance body 102 may include one or more anchor shells configured to receive one or more anchor teeth. In some examples, anchor teeth may include one or more molar teeth, premolar teeth, or both, such as, for example, teeth 103A-103D and 103K-103N, and anchor shells may include corresponding shells, such as, for example, shells 104A-104D and 104K-104N. In other examples, anchor teeth may include one or more anterior teeth, or a combination of one or more anterior and posterior teeth. Anchor shells may be configured to allow portions of appliance body 102 to deform to result in a force sufficient to move one or more teeth (e.g., force sufficient to cause alveolar bone remodeling) without resulting in sufficient force to move the respective anchor teeth. For example, anchor shells 104A-104D and 104K-104N may be coupled to one or more adjacent shells directly, without spring bellows (not shown in FIGS. 1A and 1B). In other examples, as shown in FIGS. 1A and 1B, appliance body 102 may omit any one or more of anchor shells 104A-104D and 104K-104N.

Appliance body 102 includes at least one spring bellows 108. In general, a respective spring bellows of spring bellows 108 may be positioned between respective adjacent shells 104. Removable dental appliance 100 may be formed with a physical configuration so that an undeformed removable dental appliance 100 has a shape corresponding to an intermediate or a desired position of teeth 103, such that the shape of removable dental appliance 100 is different than a current position of teeth 103. When removable dental appliance 100 is worn by the patient, appliance body 102 may deform to allow shells 104 to receive teeth 103. The deformation of appliance body 102 may result in deformation of spring bellows 108, which may induce a force, such as at least one of compression, tension, shear, bending, and torsion, in one or more portions of spring bellows 108. The force in spring bellows 108H may be transferred to first shell 104H, second shell 104I, or both. Shells 104H and 104I may be engaged with teeth 103H and 103I, and cause the force to be transferred to teeth 103H and 103I. In this way, deformation of appliance body 102 may transfer a force, via spring bellows 108 and shells 104, to the teeth 103.

The direction of the force on a respective tooth of teeth 103 may result in part from one or more locations of engagement of at least one surface of a respective shell of shells 104 with at least one surface of the respective tooth of teeth 103 and attachment points of spring bellows 108 to shells 104. In some examples, the number of locations of engagement, the total area of engagement, or both of the respective shell of shells 104 with the respective tooth of teeth 103 may be greater than the number of locations of engagement, the total area of engagement, or both of a removable dental appliance without spring bellows. For example, a force applied by a spring bellows of spring bellows 108 may be concentrated at the attachment point of the spring bellows to the shell. Thus, the direction of the applied force to a tooth of teeth 103 may be selected by selecting an attachment point of one or more spring bellows of spring bellows 108 to the shell of shells 104 that engages the tooth.

For example, a force distributed substantially evenly across the facial surface of the tooth may cause a translation of the tooth in the lingual direction. Hence, to achieve a translation of a tooth, the attachment points of the spring bellows that attach to the shell that engages the tooth may be selected to distribute force substantially evenly across the facial surface of the tooth. A force concentrated on a mesial half of a facial surface of a tooth, or one half of a facial surface and the opposite half of the lingual surface of the tooth, may cause a rotation of the tooth in the lingual direction about an axis of rotation extending generally in the occlusal-gingival direction. Hence, to achieve a rotation of a tooth, the attachment points of the spring bellows that attach to the shell that engages the tooth may be selected to distribute force on one half of a facial surface of the tooth or one half of the facial surface and the opposite half of the lingual surface of the tooth. A force concentrated on an occlusal surface (or occlusal to the height of curvature) of a tooth may cause an intrusion of the tooth. A force concentrated near a gingival margin (or gingival to the height of curvature) of a tooth may cause an extrusion of the tooth. A force concentrated on a portion of both the facial and occlusal surfaces of a tooth may cause a crown tipping of the tooth in the lingual-gingival direction. A combination of a force concentrated at a facial-occlusal surface of a tooth and a force concentrated at a lingual-gingival surface of a tooth may cause a torqueing of the tooth with the crown moving in the occlusal direction and the root moving in the facial direction. Other force vectors and combinations of force vectors that may result in one or more tooth movements are contemplated. In this manner, by selecting attachment points of spring bellows 108 to shells 104, removable dental appliance 100 may be configured to apply, via deformation of spring bellows 108, a force with a particular direction and magnitude to teeth 103 that may result in any one or more of a corresponding rotational, translational, extrusive, intrusive, tipping, or torqueing force to teeth 103.

Spring bellows 108, e.g., spring bellows 108H, may include an arcuate displacement of appliance body 102 extending over and away from at least a portion of an interproximal region, e.g., interproximal region 107H, between first and second teeth 103, e.g., first tooth 103H and second tooth 103I, to join first shell 104H and second shell 104I. The arcuate displacement may include a continuous or discontinuous curvilinear portion of appliance body 102, e.g., a half wave shape or a full wave shape. A half wave may include one half of a period of a full wave. A full wave fold may include one or more periods. In some examples, the arcuate displacement may include one fold, e.g., a half wave, or more than one fold, e.g., a full wave or a plurality of adjacent half waves. Including at least one fold in the arcuate displacement of spring bellows 108 may increase the length of the arcuate displacement between the positions where spring bellows 108 joins a respective first and second shells or shells 104. Increasing the length of the arcuate displacement may increase the flexibility of spring bellows 108. Increasing the flexibility due to increased arc length may allow spring bellows 108 to be formed of a material of a relatively higher modulus of elasticity than a less flexible spring bellows 108 due decreased arc length. Forming spring bellow 108 from a material of a higher modulus of elasticity may increase the durability of removable dental appliance 100, improve control of direction of the force applied to shells 104, or both. In other examples, the arcuate displacement may be a zigzag having two or more linear segments joined at an angle. Forming spring bellows 108 with curving shapes, for example of a zigzag shape, may result in more controllable and appropriate engaged force level and direction during tooth treatment interval.

The length of the arcuate displacement may be greater than a length of an interproximal surface extending between first intersection 110H of first shell 104H and spring bellows 108H and second intersection 112H of second shell 104I and spring bellows 108H. Additionally, the length of the arcuate displacement may be may be greater than an inward displacement (extending over and toward at least a portion of the interproximal region 107H) traversing the interproximal region. When the length of the arcuate displacement is greater than the length of the interproximal surface, an inward displacement, or both, the arcuate displacement of spring bellows 108H may bend or otherwise deform when first and second shells 104H and 104I engage respective teeth 103H and 103I, when removable dental appliance 100 is inserted to be worn by the patient. The length of the arcuate displacement may affect the amount that spring bellows 108H deforms and the resulting force on first and second shells 104H and 104I from deformation. For example, a longer arcuate displacement may result in greater deformation of spring bellows 108H, and the greater deformation may result in a greater force in spring bellows 108H, a longer distance of expression of the force in spring bellows 108H, or both, compared to a lesser deformation of a shorter arcuate displacement of spring bellows 108H. In this way, the length of the arcuate displacement of a respective spring bellows of spring bellows 108 may affect the force resulting from the deformation of the respective spring bellows of spring bellows 108 when removable dental appliance 100 is worn by the patient.

In examples in which the arcuate displacement includes a continuous curve, the arcuate displacement may define an outer radius of curvature. The outer radius of curvature of the arcuate displacement may be affected by a length of the respective spring bellows of spring bellows 108 and the respective attachment points of the spring bellows to respective shells of shells 104. The outer radius of curvature is defined at an outermost surface of the spring bellows, e.g., a facial-most surface of a facially-oriented portion of the removable dental appliance 100, or a lingual-most surface a lingually-oriented surface of the removable dental appliance 100, respectively. In some examples, the outer radius of curvature may be between about 0.5 millimeters and about 2 millimeters, or about 0.75 millimeters and about 1.5 millimeters, or about 1.0 millimeters. The radius of curvature may be substantially constant or may vary along an interproximal boundary curve. For example, a substantially constant radius of curvature may cause a substantially even force in spring bellows 108H along the interproximal boundary curve. Conversely, a variable radius of curvature may concentrate the force from deformation in one or more portions of spring bellows 108H. For example, portions of spring bellows 108H where the radius of curvature is smaller (e.g., more curved) may enable greater localized stress and, thereby, more force concentration, in the portion of spring bellows 108H where the radius of curvature is smaller, compared to portions of spring bellows 108H where the radius of curvature is larger (e.g., less curved).

The arcuate displacement may define a displacement distance extending between a midline of the interproximal surface and a midline of the arcuate displacement (e.g., a magnitude of a half wave shape of the respective spring bellows). In some examples, the displacement distance may be less than about 2 millimeters, or less than about 1 millimeter, or less than about 0.75 millimeters, or about 0.5 millimeters. The displacement distance may be substantially constant or may vary along an interproximal boundary curve. For example, a substantially constant displacement distance may cause a substantially even force in spring bellows 108H along the interproximal boundary curve. Conversely, a variable displacement distance may concentrate more force in one or more portions of spring bellows 108H where the displacement distance is larger compared to portions of spring bellows 108H where the displacement distance is smaller. By selecting the shape, length, radius of curvature, and displacement distance of the arcuate displacement of a respective spring bellows of spring bellows 108, removable dental appliance 100 may control at least one of a direction, a magnitude, and a length of expression of a force on a respective shell of shells 104 resulting from deformation of appliance body 102 when removable dental appliance 100 is worn by the patient.

A respective terminal edge of a respective spring bellows of spring bellows 108 may couple to a respective terminal edge, or another surface, of a respective shell of shells 104. For example, as shown in FIG. 1B, a first respective terminal end of spring bellows 108H is coupled to a respective terminal edge of first shell 104H at first intersection 110H. Similarly, a second respective terminal end of spring bellows 108H is coupled to a respective terminal edge of second shell 104I at second intersection 112H. The location of the first and second intersections 110H and 112H may affect the direction of the force applied by spring bellows 108H to teeth 103H and 103I, via engaged shells 104H and 104I. For example, in examples in which spring bellows 108H and first shell 104H are coupled at respective terminal edges, the force may be transferred from spring bellows 108H to a mesial edge of first tooth 103H that is engaged with a mesial edge of first shell 104H. Force transfer via engagement near the edge of the respective tooth of teeth may enable or improve desired tooth movements such as rotations, torqueing, tipping, intrusions, or extrusions. The thickness of a respective shell of shells 104 may be increased near a coupling with a respective spring bellows of spring bellows 108 to reduce adverse deformation of the respective shell of shells 104 by the force exerted by the respective spring bellows of spring bellows 108. In examples in which a respective spring bellows of spring bellows 108 and a respective shell of shells 104 are coupled near the center of the respective shell of shells 104, the force may be transferred from the respective spring bellows of spring bellows 108 to the center of a respective tooth of teeth 103 that is engaged with the respective shell of shells 104. Force transfer via engagement near the center of the respective tooth of teeth 103 may enable or improve desired tooth movements such as translations. In this way, the direction of the force from spring bellows 108 to teeth 103, via engaged shells 104, may be controlled.

The thickness of spring bellows 108 along the interproximal boundary curve or across the arcuate displacement may also be selected to control the magnitude and direction of the force resulting from deformation of spring bellows 108 when removable dental appliance 100 is worn by the patient. For example, a thickness of spring bellows 108 may be less than a thickness of first shell 104 and a thickness of second shell 106 such that spring bellows 108 deforms more than first shell 104 and second shell 106 to concentrate compression, tension, shear, bending, or torsion in spring bellows 108. The thickness of spring bellows 108 may be between about 0.025 millimeters and about 1.0 millimeter, or between about 0.1 millimeters and about 0.75 millimeters, or between about 0.15 and about 0.6 millimeters, or about 0.3 millimeters.

The thickness of spring bellows 108 may be substantially constant along the interproximal boundary curve or vary along the interproximal boundary curve to concentrate in spring bellows 108 the force resulting from a deformation of appliance body 102. For example, a respective spring bellows of spring bellows 108 may be relatively thicker near the cervical margin or gingival margin compared to near the occlusal surface. The relatively thicker portions of the respective spring bellows of spring bellows 108 may result in a greater force near the cervical margin or gingival margin compared to the occlusal portions to concentrate force near the cervical margin or gingival margin. By selecting a thickness of spring bellows 108 to concentrating the force in spring bellows 108 or in selected portions of spring bellows 108, removable dental appliance 100, when worn by the patient, may reduce deformation of shells 104 and increase engagement of shells 104 with teeth 103.

In some examples, spring bellows 108 may extend along an interproximal boundary curve extending from a facial-gingival position (e.g., where the facial side of the interproximal region meets the gingiva), over the occlusal plane of the dental arch, to a lingual-gingival position (e.g., where the lingual side of the interproximal region meets the gingiva). In some examples, spring bellows 108 may extend along less than the full interproximal boundary curve. By controlling the locations over which spring bellows 108 extends the interproximal region, removable dental appliance may control the locations on teeth 103 where the force is applied.

For example, in some implementations, spring bellows 108 may define at least one shear reduction region. The at least one shear reduction region may include at least one void or cutout in spring bellows 108. The at least one shear reduction region may concentrate deformation of spring bellows 108 in selected portions of spring bellows 108. For example, by including a void or cutout in spring bellows 108 in a shear reduction region, the shear force (or other forces such as compression, tension, bending, or torsion) may be effectively reduced to zero in the shear reduction region. By reducing the shear force to zero in the shear reduction regions, the force that would otherwise be present in the shear reduction region is concentrated in other portions of spring bellows 108, such as, for example, remaining portions of spring bellows 108. In this way, shear reduction regions may concentrate the force caused by deformation of spring bellows 108 when removable dental appliance 100 is worn by the patient in selected regions of the spring bellows 108.

In some examples, spring bellows 108 may overlap at least a portion of the gingiva (e.g., gingival margins) of the patient. For example, a respective spring bellows of spring bellows 108 may extend around the gingival portion of a respective shell of shells 104, where the respective tooth of teeth 103 meets the gingiva. The respective spring bellows of spring bellows 108 may be configured to anchor to at least a portion of the alveolar bone via the gingiva. For example, when worn by the patient, the respective spring bellows of spring bellows 108 may at least partially contact the gingiva overlying the alveolar process to result in at least a portion of the deformation of the respective spring bellows of spring bellows 108. In this way, removable dental appliance 100 may be configured to utilize the alveolar process as an anchor.

For example, including one or more spring bellows 108 coupled to one or more respective portions of shells 104 extending to contact the gingiva may access additional bracing provided by the extended surface indirectly engaging with the alveolar process without impeding mobility of teeth 103. Additional, or alternatively, by increasing an extent of spring bellows 108 coupled to a single shell of shells 104, greater force could be applied to a selected tooth of teeth 103 while using the more rigid alveolar process as an anchor instead of neighboring teeth. As such, another advantage could be better control of tooth movements relative to a fixed reference (the alveolar process), without causing unwanted reactionary movements of neighboring teeth.

In some examples, appliance body 102 may be formed from a unitary material, e.g., a single, uniform material. The unitary material may include a single polymer, or substantially homogeneous mixture of one or more polymers. For example, removable dental appliance 100 may consist of a single, continuous 3D printed or thermoformed component. In other examples, appliance body 102 may include a multi-layer material. The multi-layer material may include multiple layers of a single material, e.g., a single polymer, or multiple layers of a plurality of materials, e.g., two or more polymers, a polymer and another material. Multi-layer materials may enable one or more portions of appliance body 102 to be formed with a plurality of layers having different elastic modulus to enable selection of force characteristics, displacement characteristics, or both of spring bellows 108. For example, removable dental appliance 100 may consist of a multilayer 3D printed or thermoformed component. Suitable polymers may include, but are not limited to, (meth)acrylate polymer; epoxy; silicones; polyesters; polyurethanes; polycarbonate; thiol-ene polymers; acrylate polymers such as urethane (meth)acrylate polymers, polyalkylene oxide di(meth)acrylate, alkane diol di(meth)acrylate, aliphatic (meth)acrylates, silicone (meth)acrylate; polyethylene terephthalate based polymers such as polyethylene terephthalate glycol (PETG); polypropylene; ethylene-vinyl acetate; or the like. In the same or different examples, removable dental appliance 100 may include chamfers or fillets on edges of appliance body 102 and other spaces. Such chamfers or fillets may improve patient comfort and reduce the visibility of removable dental appliance 100.

In other examples, removable dental appliance 100 may include metallic components configured to enhance forces applied by removable dental appliance 100 to one or more of the surrounded teeth. For example, the metallic component may comprise a wire or ribbon extending through at least a portion of appliance body 102, such as spring bellows 108. In some examples, removable dental appliance 100 may include one or more other metal components, such as metal occlusal components, where greater durability is needed to overcome the stress of high-pressure occlusal contact, such as bruxing, or mastication. In some examples, removable dental appliance 100 may include catches to connect to an anchorage device implanted within the patient, e.g., a temporary anchorage device or mini-screw. For example, catches may be positioned on anchor shells 104A-104D and 104K-104N to connect to an anchorage device on anchor teeth 103A-103D and 103K-103N. In this manner, such removable dental appliances 100 may provide a hybrid construction of metal and plastic.

While plastic components may be generally clear for reduced visibility, metal components may include plating or other coloring to reduce visibility of removable dental appliance 100 when worn by the patient. For example, metal components positioned near teeth 103 of a patient when worn may include white colored coating or plating, such as, for example, rhodium, silver, white anodized titanium, Teflon, PTFE, and the like, or be formed of a white colored metal, such as, for example, rhodium, silver, white anodized titanium, and the like. Metal components positioned elsewhere may be colored to generally match tissue color within the mouth of the patient.

FIGS. 2A to 2I illustrate different views of another example removable dental appliance 200 that includes appliance body 202. Appliance body 202 includes plurality of spring bellows 208A-208M (collectively, "spring bellows 208") coupled to plurality of shells 204A-204N (collectively, "shells 204") at first intersections 210A-210M (collectively, "first intersections 210") and second intersections 212A-212M (collectively, "second intersections 212").

Removable dental appliance 200 of FIGS. 2A to 2I may be the same as or substantially similar to removable dental appliance 100 of FIGS. 1A and 1B, except that FIGS. 2A to 2I do not show dental arch 101 or teeth 103 of the patient. For purposes of illustration, FIGS. 2B to 2I do not show labels for all of shells 204, spring bellows 208, first intersections 210, or second intersections 212, although it is understood that appliance body 202 of FIGS. 2B to 2I defines fourteen shells (one for each tooth) and thirteen spring bellows (one spring bellows between each pair of adjacent shells). Each of shells 204, spring bellows 208, first intersections 210, and second intersections 212 may be the same as or substantially similar to shells 104, spring bellows 108, first intersections 110, and second intersections 112, respectively, as describe above with respect to FIGS. 1A and 1B.

Figure 3A:
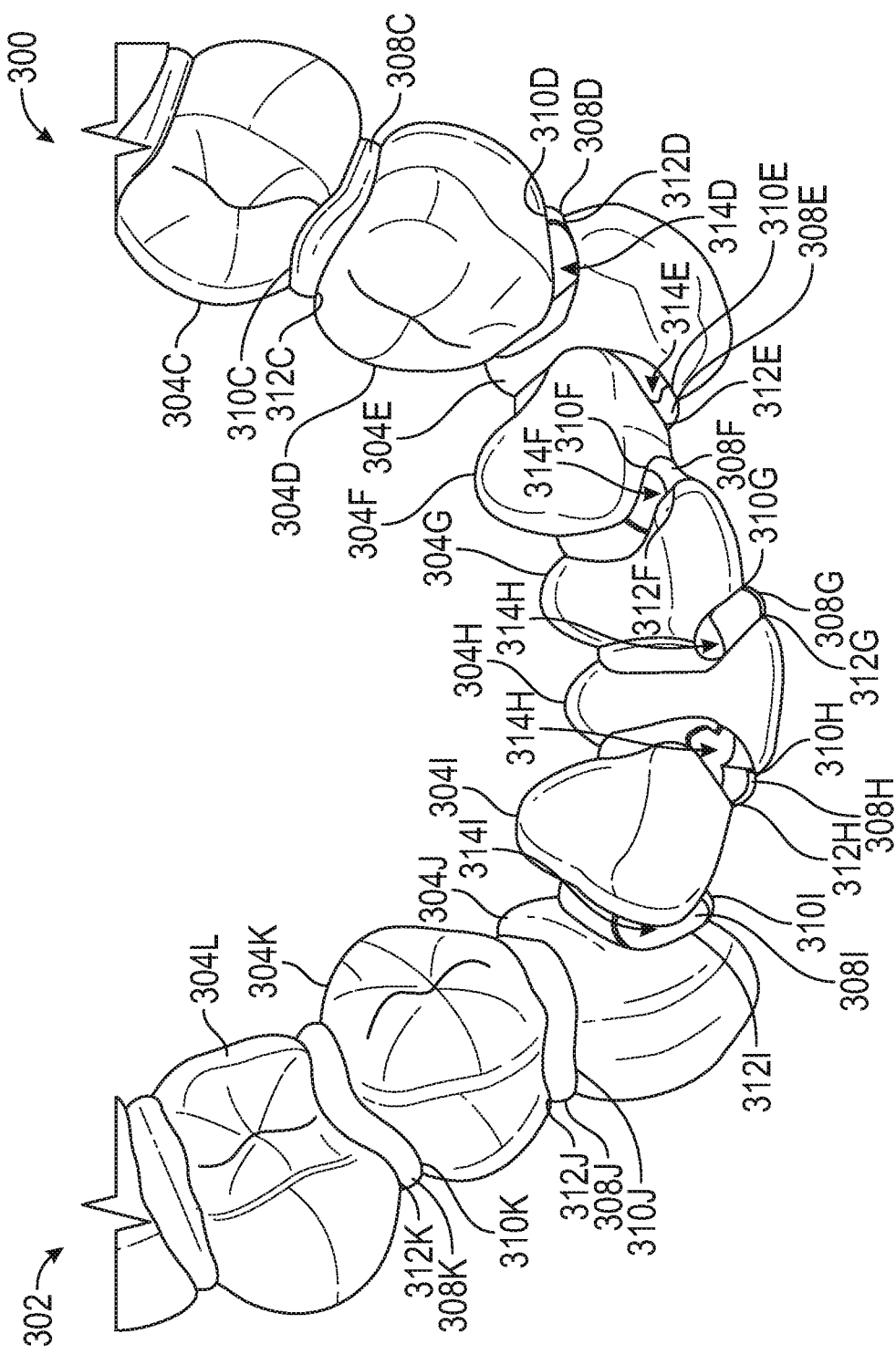
FIGS. 3A and 3B illustrate different views of an example removable dental appliance that includes a plurality of spring bellows and shear reduction regions.
Figure 3B:
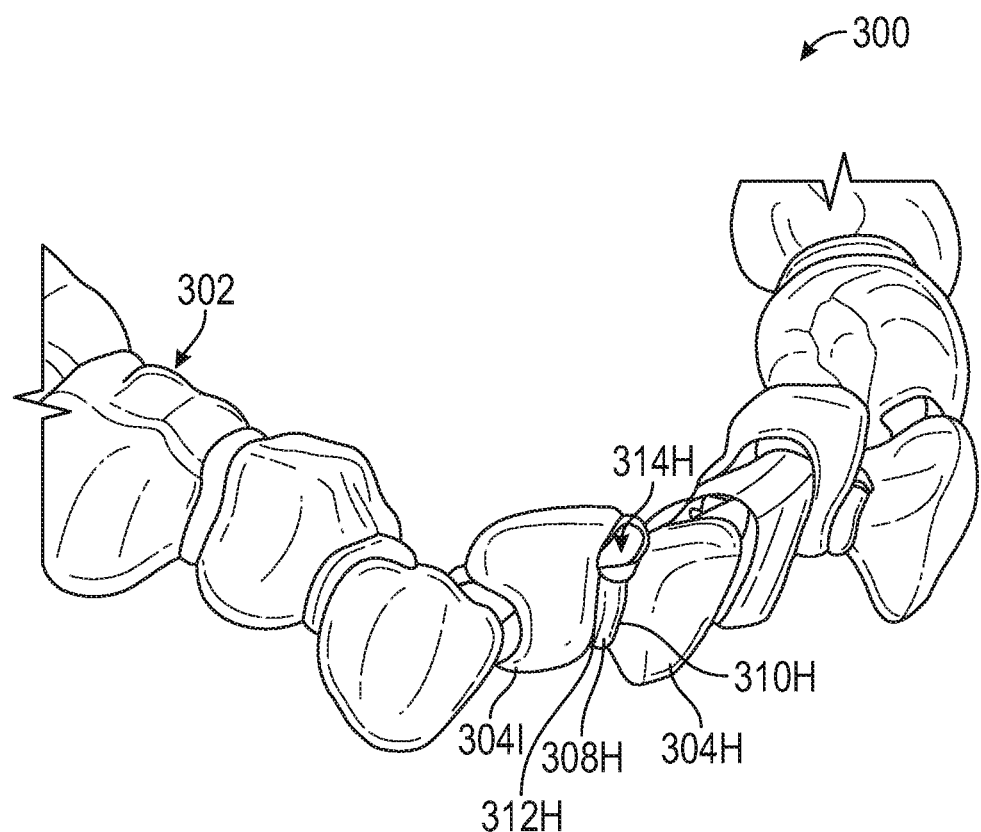

FIGS. 3A and 3B illustrate an example removable dental appliance 300 that includes appliance body 302. For purposes of illustration, only plurality of spring bellows 308C-308K coupled to plurality of shells 304C-304L at first intersections 310C-310K and second intersections 312C-312K are shown in FIGS. 3A and 3B, although appliance body 302 may include a plurality of spring bellows 308A-308M (collectively, "spring bellows 308") coupled to a plurality of shells 304A-304N (collectively, "shells 304") at first intersections 310A-310M (collectively, "first intersections 310") and second intersections 312A-312M (collectively, "second intersections 312"). Removable dental appliance 300 of FIGS. 3A and 3B is the same as or substantially similar to removable dental appliances 100 and 200, except that removable dental appliance 300 includes a plurality of shear reduction regions 314D-314I.

As shown in FIG. 3A, spring bellows 308 may include shear reductions regions 314A-314M (collectively, "shear reduction regions 314"). Generally, appliance body 302 may include shear reduction regions 314 in any location where opposite directions of motion are desired on either side of a respective shear reduction region of shear reduction regions 314. In some examples, at least one respective spring bellows of spring bellows 308 may define at least one respective shear reduction region of shear reduction regions 314. In other examples, other portions of appliance body 302 may define shear reduction regions 314. Shear reduction regions 314 may include at least one void or cutout in appliance body 302 configured to concentrate deformation of appliance body 302 in selected portions of appliance body 302, such as, e.g., selected portions of spring bellows 308. Any number of spring bellows 308 may define shear reduction regions 314 on at least one of a facial, occlusal, or lingual surface of spring bellows 308. For example, as shown in FIGS. 3A and 3B, shear reduction regions 314 may include voids in an occlusal surface of each of spring bellows 308D-308I. In some examples, shear reduction regions 314 may each include a single cutout in appliance body 302. In other examples, shear reduction regions 314 each may include multiple cutouts, such as, for example, a plurality of slits in spring bellows 308, a plurality of closely positioned holes in spring bellows 308, or the like. Multiple cutouts may enable appliance body 302 (e.g., two adjacent shells) to maintain a desired shape or configuration compared to a single cutout. The absence of material in shear reduction regions 314 may reduce the resistance to shear deformation in shear reduction regions 314. For example, if an actual deformation of a respective spring bellows of spring bellows 308 results in a shear web that resists a desired deformation of the respective spring bellows of spring bellows 308, then a respective shear reduction region 314 may remove the shear web and allow the desired deformation of the respective spring bellows of spring bellows 308. By reducing the resistance to shear deformation in shear reduction regions 314, the resistance to shear deformation that would otherwise be present in shear reduction region 314 may be reduced to enable a desired deformation of, and resulting force exerted by, spring bellows 308.

For example, spring bellows 308D-308I define shear reduction regions 314D-314I near an occlusal surface of spring bellows 308D-308I. Shear reduction regions 314D-314I may reduce the resistance shear deformation that would otherwise be present in the occlusal surfaces of spring bellows 308D-308I. As one example, shear reduction region 314G may reduce the resistance to shear deformation that would otherwise be present in spring bellows 308G as the appliance body 302 applies a force to move shell 304G in the facial direction and shell 304H in the lingual direction. As another example, shear reduction region 314D may reduce the resistance to shear deformation that would otherwise be present in spring bellows 308D as the appliance body 302 applies a force to move shell 304D in the facial direction and shell 304E in the lingual direction. In other examples, a respective shear reduction region near a respective occlusal surface of a respective shell may reduce the resistance to shear deformation in the respective occlusal surface of the respective shell when the respective shell is configured to cause a rotation of a respective tooth. In other examples, a respective shear reduction region near one or both of a lingual or a facial surface of a respective shell may reduce the resistance to shear deformation in the respective lingual or facial surface of the respective shell when the respective shell is configured to cause an intrusion or an extrusion. In this way, shear reduction regions 314 may reduce undesired resistance to shear deformation in selected regions of the spring bellows 108 when removable dental appliance 100 is worn by the patient.

Figure 4:
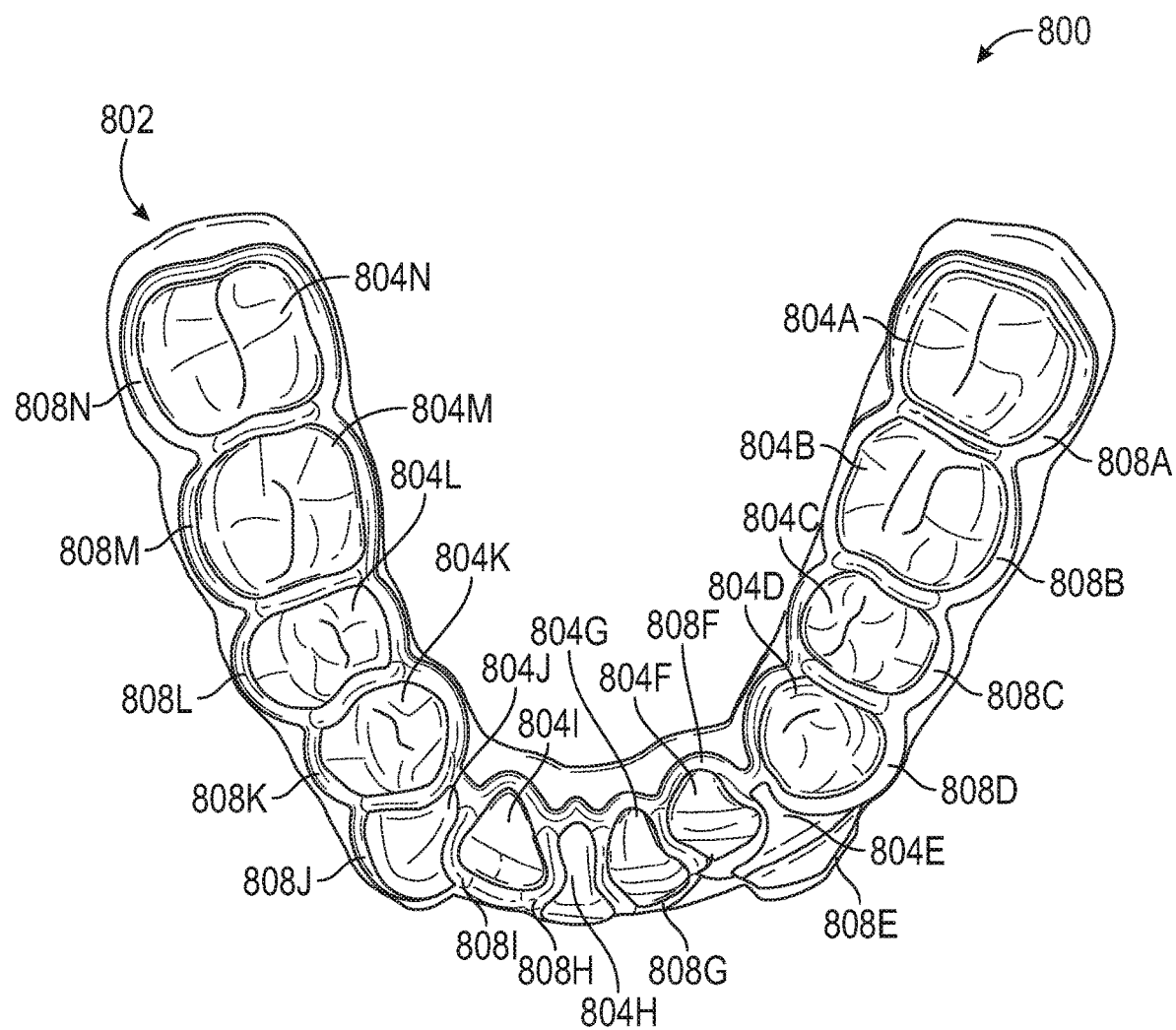
FIG. 4 illustrates an occlusal view of an example removable dental appliance that includes a plurality of spring bellows extending around the respective gingival margin of each respective shell.

FIG. 4 illustrates an occlusal view of an example removable dental appliance 800 that includes a plurality of spring bellows 808A-808N (collectively, "spring bellows 808"), each respective spring bellows 808 extending around a respective cervical margin or gingival margin of each respective shell of a plurality of shells 804A-804N (collectively, "shells 804"). Removable dental appliance 800 may be the same as or substantially similar to at least one of removable dental appliances 100, 200, and 300, except for the differences described herein. For example, removable dental appliance 800 may include first and second intersections coupling a respective spring bellows to respective shells, shear reduction regions, or the like. As shown in FIG. 4, removable dental appliance 800 includes spring bellows 808. Each respective spring bellows of spring bellows 808 extends around respective shell of shells 804 to overlap at least a portion of the gingiva (e.g., gingival margins) of the patient. In some examples, removable dental appliance 800 may include a combination of first spring bellows of spring bellows 808 extending around the cervical margin or gingival margin, and second spring bellows of spring bellows 808 extending only in or near the interproximal region.

In some examples, a respective spring bellows of spring bellows 808 may be relatively thicker near the cervical margin or gingival margin compared to near the occlusal surface. The relatively thicker portions of the respective spring bellows of spring bellows 808 may result in a greater force near the cervical margin or gingival margin compared to the occlusal portions to concentrate force near the cervical margin or gingival margin. By selecting a thickness of spring bellows 808 to concentrate the force in spring bellows 808 or in selected portions of spring bellows 808, removable dental appliance 800, when worn by the patient, may reduce deformation of shells 804 and increase engagement of shells 804 with the teeth.

In some examples, a respective spring bellows of spring bellows 808 is configured to anchor to at least a portion of the alveolar bone via the gingiva. For example, when worn by the patient, the respective spring bellows of spring bellows 808 at least partially contacts the gingiva overlying the alveolar process to result in at least a portion of the deformation of the respective spring bellows of spring bellows 808. As discussed above, including one or more spring bellows 808 coupled to one or more respective portions of shells 804 extending to contact the gingiva may access additional bracing provided by the extended surface indirectly engaging with the alveolar process without impeding mobility of teeth 103. Additionally, or alternatively, by increasing an extent of spring bellows 808 coupled to a single shell of shells 804, greater force could be applied to a selected tooth while using the more rigid alveolar process as an anchor instead of neighboring teeth. As such, another advantage could be better control of tooth movements relative to a fixed reference (the alveolar process), without causing unwanted reactionary movements of neighboring teeth.

Figure 5:
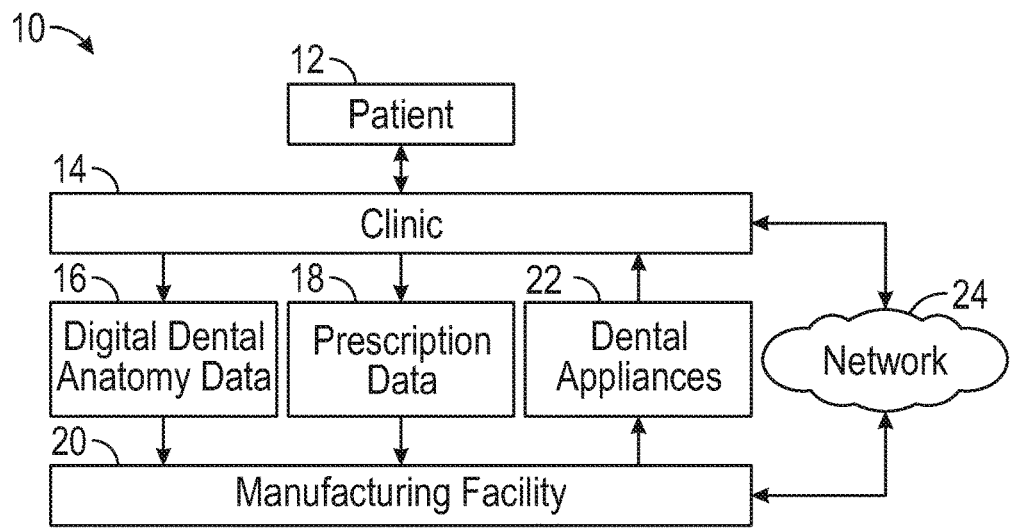
FIG. 5 is a block diagram illustrating an example computer environment in which a clinic and manufacturing facility communicate information throughout a dental appliance manufacturing process.

FIG. 5 is a block diagram illustrating an example computer environment 10 in which clinic 14 and manufacturing facility 20 communicate information throughout a manufacturing process of a set of removable dental appliances 22 for patient 12. The set of removable dental appliances 22 may include at least one of removable dental appliances 100, 200, and 300. As discussed above, removable dental appliances 100, 200, and 300 may include at least two shells and at least one spring bellows. Initially, an orthodontic practitioner of clinic 14 generates one or more images of a dental anatomy of patient 12 using any suitable imaging technique and generates digital dental anatomy data 46 (e.g., a digital representation of patient's 12 tooth structure). For example, the practitioner may generate X-RAY images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of three-dimensional (3D) data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.), which is incorporated by reference herein. Alternatively, other intra-oral scanners or intra-oral contact probes may be used. As another option, the digital dental anatomy data 16 may be provided by scanning a negative impression of patient's 12 teeth. As still another option, the digital dental anatomy data 16 may be provided by imaging a positive physical model of patient's 12 teeth or by using a contact probe on a model of patient's 12 teeth. The model used for scanning may be made, for example, by casting an impression of patient's 12 dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.), which is incorporated by reference herein.

In addition to providing digital images by scanning the exposed surfaces of the teeth, it is possible to image non-visible features of the dentition, such as the roots of patient's 12 teeth and patient's 12 jaw bones. In some embodiments, the digital dental anatomy data 16 is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), which is incorporated by reference herein, and U.S. Patent Publication No. 2004/0029068 (Badura, et al.), which is also incorporated by reference herein. Issued U.S. Pat. No. 7,027,642 (Imgrund, et al.), which is incorporated by reference herein, and U.S Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental anatomies that are hidden from view. The dental anatomy may include, but is not limited to, any portion of crowns or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

To generate digital dental anatomy data 16, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. For this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation allows a user to characterize and manipulate the teeth arrangement as a set of individual objects. Advantageously, the computer may derive diagnostic information such as arch length, bite setting, interstitial spacing between adjacent teeth, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental anatomy data 16, clinic 14 may store digital dental anatomy data 16 within a patient record in a database. Clinic 14 may, for example, update a local database having a plurality of patient records. Alternatively, clinic 14 may remotely update a central database (optionally within manufacturing facility 20) via network 24. After digital dental anatomy data 16 is stored, clinic 14 electronically communicates digital dental anatomy data 16 to manufacturing facility 20. Alternatively, manufacturing facility 20 may retrieve digital dental anatomy data 16 from the central database. Alternatively, manufacturing facility 20 may retrieve preexisting digital dental anatomy data 16 from a data source unassociated with clinic 14.

Clinic 14 may also forward prescription data 18 conveying general information regarding a practitioner's diagnosis and treatment plan for patient 12 to manufacturing facility 20. In some examples, prescription data 18 may be more specific. For example, digital dental anatomy data 16 may be a digital representation of the dental anatomy of patient 12. The practitioner of clinic 14 may review the digital representation and indicate at least one of desired movements, spacing, or final positions of individual teeth of patient 12. For example, the desired movements, spacing, and final positions of individual teeth of patient 12 may affect the forces to be applied to the teeth of patient 12 at each stage of treatment by each removable dental appliance of the set of removable dental appliances 22. As discussed above, the forces applied by each removable dental appliance (e.g., removable dental appliance 100, 200, or 300) of the set of removable dental appliances 22 may be determined by selecting the dimensions, shapes, and positions of the spring bellows (e.g., spring bellows 108, 208, or 308) and shells (e.g., first and second shells 104, 204, or 304). The at least one of desired movements, spacing, or final positions of individual teeth of patient 12 may enable the practitioner, a technician at manufacturing facility 20, and a computer at manufacturing facility 20 to determine at least one of selected dimensions, shapes, and positions of at least one of the shells and spring bellows. In this way, digital dental anatomy data 16 may include at least one of practitioner, technician, or computer selected dimensions, shapes, and positions of at least one of the spring bellows and the shells of each of removable dental appliance of the set of removable dental appliances 22 to result in the desired movement of the teeth of patient 12. Following review of the digital representation, the digital dental anatomy data 16 that includes the selected dimensions, shapes, and positions of the spring bellows and shells of each removable dental appliance of the set of removable dental appliances 22, may be forwarded to manufacturing facility 20. Manufacturing facility 20 may be located off-site, or located with clinic 14.

For example, each clinic 14 may include its own equipment for manufacturing facility 20 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental anatomy of patient 12 through additive manufacturing. The 3D printer may use iterative digital designs of original dental anatomy of patient 12 as well as a desired dental anatomy of patient 12 to produce multiple digital appliances and/or digital appliance patterns customized to produce the desired dental anatomy of patient 12. Manufacturing may include postprocessing to remove uncured resin and remove support structures, or to assemble various components, which may also be necessary and could also be performed in a clinical setting.

Manufacturing facility 20 utilizes digital dental anatomy data 16 of patient 12 to construct the set of removable dental appliances 22 to reposition teeth of patient 12. Sometime thereafter, manufacturing facility 20 forwards the set of removable dental appliances 22 to clinic 14 or, alternatively, directly to patient 12. For example, the set of removable dental appliances 22 may be an ordered set of removable dental appliances. Patient 12 then wears the removable dental appliances 22 in the set of removable dental appliances 22 sequentially over time according to a prescribed schedule to reposition the teeth of patient 12. For example, patient 12 may wear each removable dental appliance in the set of removable dental appliances 22 for a period of between about 1 week and about 6 weeks, such as between about 2 weeks and about 4 weeks, or about 3 weeks. Optionally, patient 12 may return to clinic 14 for periodic monitoring of the progress of the treatment with removable dental appliances 22.

During such periodic monitoring, a clinician may adjust the prescribed schedule of patient 12 for wearing the removable dental appliances in the set of removable dental appliances 22 sequentially over time. Monitoring generally includes visual inspection of the teeth of patient 12 and may also include imaging to generate digital dental anatomy data. In some relatively uncommon circumstances, the clinician may decide to interrupt the treatment of patient 12 with the set of removable dental appliances 22, for example, by sending the newly generated digital dental anatomy data 16 to manufacturing facility 20 in order to produce a new set of removable dental appliances 22. In the same or different examples, the clinician may send newly generated digital dental anatomy data 16 to manufacturing facility 20 following the completion of the prescribed schedule of the treatment with removable dental appliances 22. In addition, following the completion of the prescribed schedule of the treatment with removable dental appliances 22, the clinician may request a new set of removable dental appliances from manufacturing facility 20 to continue treatment of patient 12.

Figure 6:
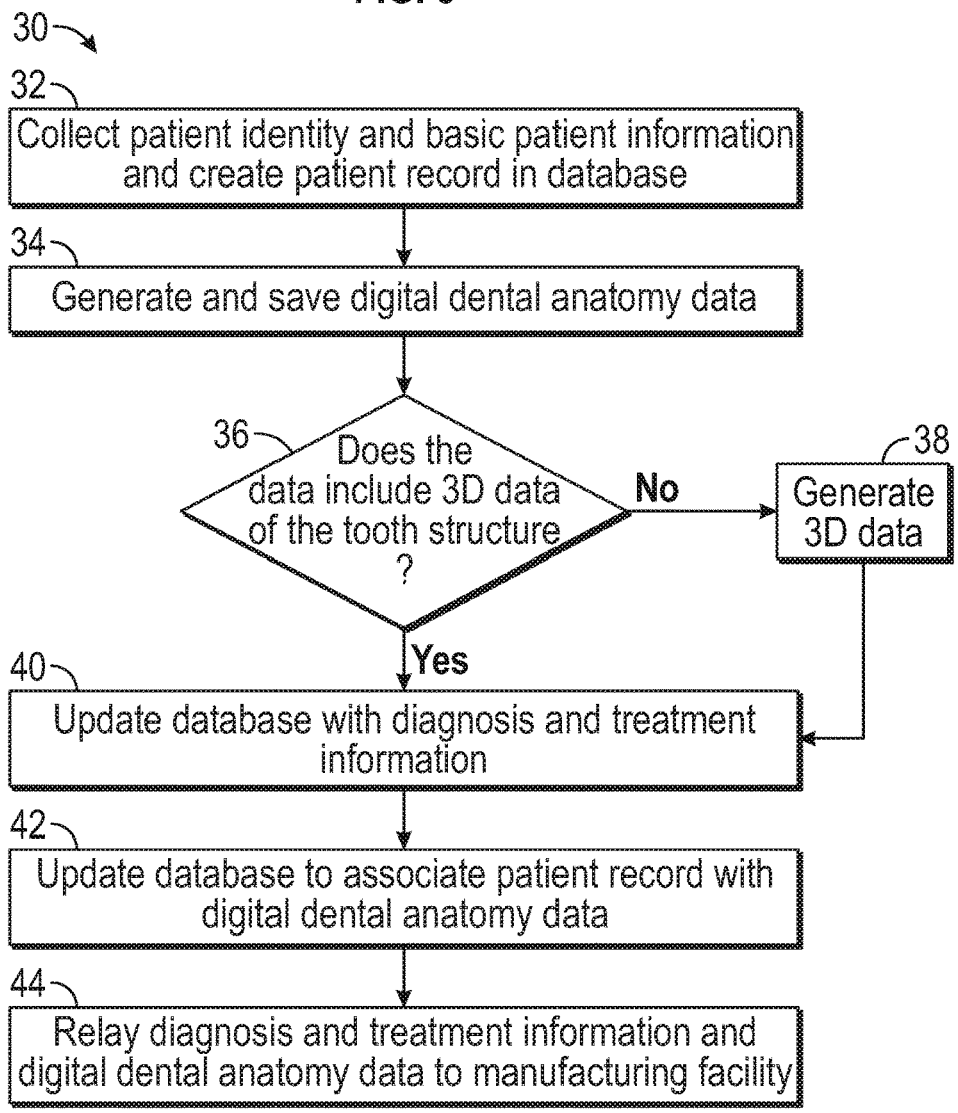
FIG. 6 is a flow diagram illustrating an example process of generating digital dental anatomy data.

FIG. 6 is a flow diagram illustrating process 30 conducted at clinic 14 in accordance with one example of this disclosure. Initially, a practitioner at clinic 14 collects patient identity and other information from patient 12 and creates a patient record (32). As described, the patient record may be located within clinic 14 and optionally configured to share data with a database within manufacturing facility 20. Alternatively, the patient record may be located within a database at manufacturing facility 20 that is remotely accessible to clinic 14 via network 24 or within a database that is remotely accessible by both manufacturing facility 20 and clinic 14.

Next, digital dental anatomy data 16 of patient 12 may be generated using any suitable technique (34), to thereby create a virtual dental anatomy. Digital dental anatomy data 16 may be comprised of a two-dimensional (2D) image and/or a three-dimensional (3D) representation of the dental anatomy.

In one example, 3D representations of a dental anatomy are generated using a cone beam computerized tomography (CBCT) scanner, such as an i-CAT 3D dental imaging device (available from Imaging Sciences International, LLC; 1910 N Penn Road, Hatfield, Pa.). Clinic 14 stores the 3D digital dental anatomy data 16 (in the form of radiological images) generated from the CBCT scanner in the database located within clinic 14, or alternatively, within manufacturing facility 20. The computing system processes the digital dental anatomy data 16 from the CBCT scanner, which may be in the form of a plurality of slices, to compute a digital representation of the tooth structure that may be manipulated within the 3D modeling environment.

If 2D radiological images are used (36), then the practitioner may further generate 3D digital data (38). The 3D digital dental anatomy data 16 may be produced by, for example, forming and subsequently digitally scanning a physical impression or casting of the tooth structure of patient 12. For example, a physical impression or casting of a dental arch of patient 12 may be scanned using a visible light scanner, such as an OM-3R scanner (available from Laser Design, Inc. of Minneapolis, Minn.) or an ATOS scanner (available from GOM GmbH of Braunschweig, Germany). Alternatively, the practitioner may generate the 3D digital dental anatomy data 16 of the occlusal service by use of an intra-oral scan of the dental arch of patient 12, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, which is incorporated herein by reference in its entirety, may be used. In the same or different examples, techniques for defining a virtual tooth surface and virtual tooth coordinate system as described in U.S. Patent Application Publication No. 2013/0325431, titled ORTHODONTIC DIGITAL SETUPS," and published on Dec. 5, 2013 may be used, which is incorporated herein by reference in its entirety. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the tooth structure of patient 12 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low-resolution image of the roots obtained from a CBCT scanner (e.g., an i-CAT 3D dental imaging device) and the second 3D digital representation may be a relatively high-resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software (available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the tooth structure, including the occlusal surface as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the final positions of individual teeth of patient 12, duration of a respective stage of treatment, or number of treatment stages, the direction or magnitude of forces on the teeth of patient 12 during a stage of treatment, or the like (40). For example, the final positions of individual teeth of patient 12, duration of a respective stage of treatment, or number of treatment stages may affect the direction or magnitude of forces on the teeth of patient 12 at each stage of treatment by each removable dental appliance of the set of removable dental appliances 22. In some examples, spring bellows may be used during at least one, but fewer than all stages of treatment. As discussed above, the forces applied by each removable dental appliance (e.g., removable dental appliances 100, 200, or 300) of the set of removable dental appliances 22 may be determined by selecting the dimensions, shapes, and positions of the spring bellows (e.g., spring bellows 108, 208, or 308) and shells (e.g., shells 104, 204, or 304). In this way, updating the database with diagnostic and treatment information (40) may include determining or selecting by the practitioner, a technician, or automatically by a computer the dimensions, shapes, and positions of the spring bellows and shells of each of removable dental appliance of the set of removable dental appliances 22 to result in the desired movement of the teeth of patient 12.

Once the practitioner has finished conveying general information regarding a diagnosis and treatment plan within the 3D environment, the computer system updates the database associated with the patient record to record the prescription data 18 conveying general information regarding a diagnosis and treatment plan as specified by the practitioner (42). Thereafter, the prescription data 18 is relayed to manufacturing facility 20 for manufacturing facility 20 to construct one or more removable dental appliances including spring bellows, such as removable dental appliances 22 (44).

Although described with respect to an orthodontic practitioner located at an orthodontic clinic, one or more of the steps discussed with respect to FIG. 6 may be performed by a remote user, such as a user located at manufacturing facility 20. For example, the orthodontic practitioner may only send radiological image data and an impression or casting of the patient to manufacturing facility 20, where a user interacts with a computer system to develop a treatment plan within a 3D modeling environment. Optionally, a digital representation of the treatment plan within the 3D modeling environment may then be transmitted to the orthodontic practitioner of clinic 14, who may review the treatment plan and either send back his or her approval, or indicate desired changes.

Figure 7:
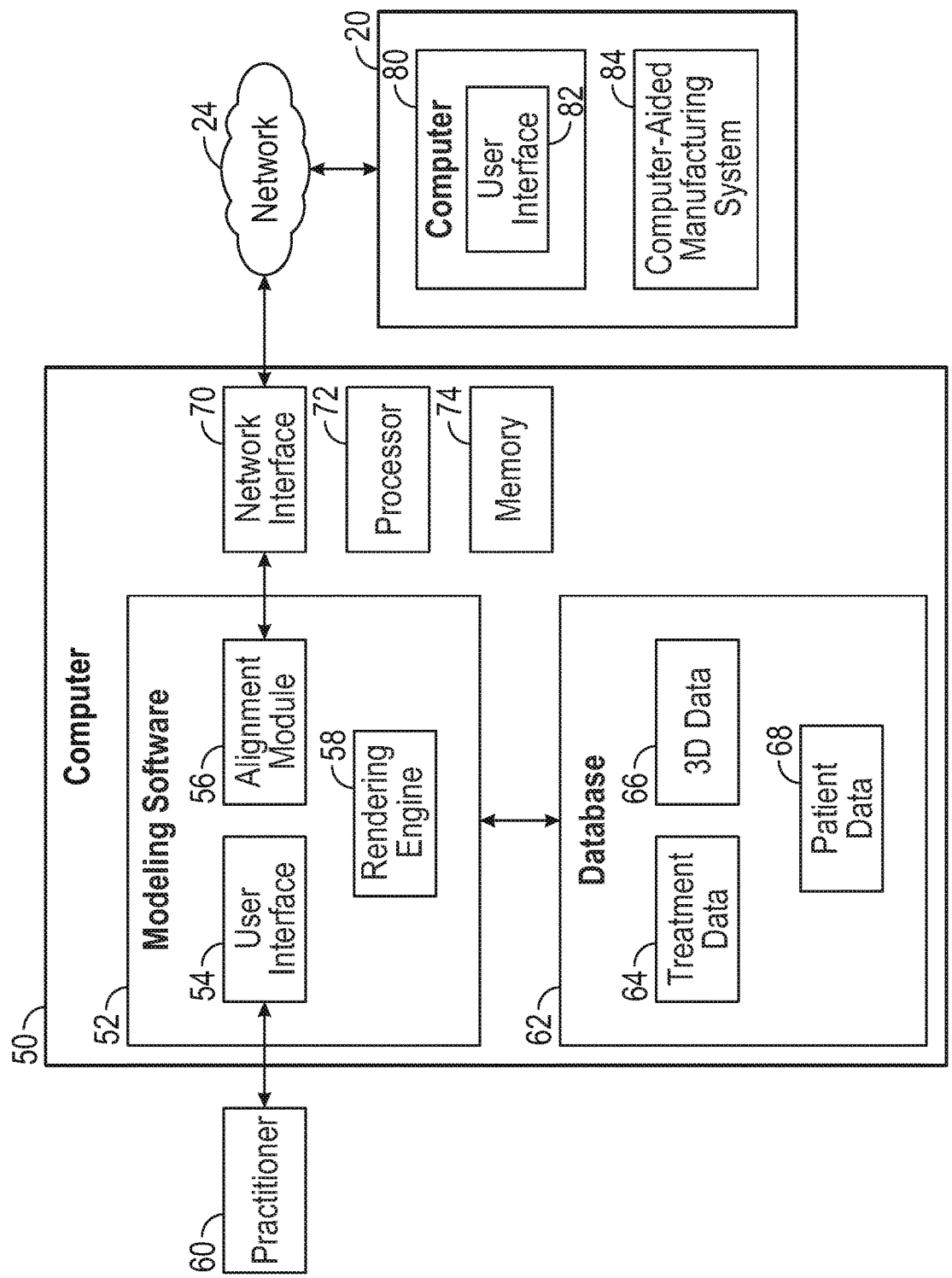
FIG. 7 is a block diagram illustrating an example of a client computing device connected to a manufacturing facility via a network to generate digital dental anatomy data.

FIG. 7 is a block diagram illustrating an example of a client computer 50 connected to manufacturing facility 20 via network 24. In the illustrated example, client computer 50 provides an operating environment for modeling software 52. Modeling software 52 presents a modeling environment for modeling and depicting the 3D representation of the teeth of patient 12. In the illustrated example, modeling software 52 includes user interface 54, alignment module 56, and rendering engine 58.

User interface 54 provides a graphical user interface (GUI) that visually displays the 3D representation of patient's 12 teeth. In addition, user interface 54 provides an interface for receiving input from practitioner 60 of clinic 14, e.g., via a keyboard and a pointing device, a touchscreen, or the like, for manipulating patient's 12 teeth within the modeled dental arch.

Modeling software 52 may be accessible to manufacturing facility 20 via network interface 70. Modeling software 52 interacts with database 62 to access a variety of data, such as treatment data 64, 3D data 66 relating to the tooth structure of patient 12, and patient data 68. Database 62 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computer 50, database 62 may be located remote from the client computer 50 and coupled to the client computer 50 via a public or private network, e.g., network 24.

Treatment data 64 describes diagnosis or repositioning information for the teeth of patient 12 selected by practitioner 60 and positioned within the 3D modeling environment. For example, treatment data 64 may include the dimensions, shapes, and positions of the spring bellows (e.g., spring bellows 108, 208, and 308) and shells (e.g., shells 104, 204, and 304) that may result in a selected magnitude and direction of force vectors to be applied to patient's teeth (e.g., teeth 103) throughout the treatment plans.

Patient data 68 describes a set of one or more patients, e.g., patient 12, associated with practitioner 60. For example, patient data 68 specifies general information, such as a name, birth date, and a dental history, for each patient 12.

Rendering engine 58 accesses and renders 3D data 66 to generate the 3D view presented to practitioner 60 by user interface 54. More specifically, 3D data 66 includes information defining the 3D objects that represent each tooth (optionally including roots), and jaw bone within the 3D environment. Rendering engine 58 processes each object to render a 3D triangular mesh based on viewing perspective of practitioner 60 within the 3D environment. User interface 54 displays the rendered 3D triangular mesh to practitioner 60, and allows practitioner 60 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein, each of which are incorporated by reference in their entireties.

Client computer 50 includes processor 72 and memory 74 to store and execute modeling software 52. Memory 74 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 72 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 74 may store program instructions (e.g., software instructions) that are executed by processor 72 to carry out the techniques described herein. In other examples, the techniques may be executed by specifically programmed circuitry of processor 72. In these or other ways, processor 72 may be configured to execute the techniques described herein.

Client computer 50 is configured to send a digital representation of a 3D tooth structure of a patient, and optionally, treatment data 64 and/or patient data 68 to computer 80 of manufacturing facility 20 via network 24. Computer 80 includes user interface 82. User interface 82 provides a GUI that visually displays the 3D representation of the digital model of teeth. In addition, user interface 82 provides an interface for receiving input from a user, e.g., via a keyboard and a pointing device, for manipulating a patient's teeth within the digital representation of the 3D tooth structure of the patient.

Computer 80 may further be configured to automatically determine dimensions and shapes of each removable dental appliance of a set of removable dental appliances 22. The dimensions and shapes of removable dental appliance 22 may include a position, dimension, and shape of shells and spring bellows such that removable dental appliance 22 is configured to reposition the one or more teeth from their initial positions to final positions when the removable dental appliance is worn by the patient. As discussed above with respect to FIGS. 1-3, the position, dimension, and shape of the shells, spring bellows, and shear reduction regions may affect the magnitude, direction, and length of expression of a force applied to the teeth when the removable dental appliance is worn by the patient. For example, the thickness and shape of a respective spring bellows of a plurality of spring bellows may determine, at least in part, the magnitude, direction, and length of expression of the force resulting from a deformation of the respective spring bellows when the removable dental appliance is worn by the patient. The position, dimension, and shape of the shear reduction regions may concentrate deformation in selected regions of the spring bellows to control the direction of force applied to the shells. The locations where a respective spring bellows is coupled to a respective shell may also determine, at least in part, the direction of the force that may be transferred from a respective spring bellows to a respective shell. Also, the location or locations of engagement of a respective shell with a respective tooth determine the direction of the force applied to the respective tooth. Computer 80 may analyze at least one of the magnitude, direction, and length of expression of the force resulting from a deformation of the respective spring bellows when the removable dental appliance is worn by the patient to determine at least one of position, dimension, and shape of a respective shells and spring bellows that will result in a desired movement of the patient's teeth when the removable dental appliance is worn by the patient.

Computer 80 may present a representation of the removable dental appliance 22 for the user to review, including review of dimensions and shapes. Alternatively, or additionally, computer 80 may accept input from a user to determine dimensions and shapes of a set of removable dental appliances 22 for patient 12. For example, the user input may influence at least one of an automatically determined dimensions or shapes. Computer 80 may transmit, or otherwise send, a digital model of the set of removable dental appliance 22, the dimensions and shapes of the set of removable dental appliances 22, or both, to computer-aided manufacturing system 84 for production of the set of removable dental appliances 22.

Client computer 50 and computer 80 are merely conceptual representations of an example computer system. In some examples, the functionalities described with respect to client computer 50, computer 80, or both may be combined into a single computing device or distributed among multiple computing devices within a computer system. For example, cloud computing may be used for digital design of dental appliances described herein. In one example, the digital representations of tooth structures are received at one computer at the clinic, while a different computer, such as computer 80, is used to determine the shapes and dimensions of a removable dental appliance. In addition, it may not be necessary for that different computer, such as computer 80, to receive all of the same data in order for it to determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computer 50 and computer 80, or otherwise utilized to design a custom dental appliance may be significantly less than the complete data set representing a complete digital dental model of a patient.

Figure 8:
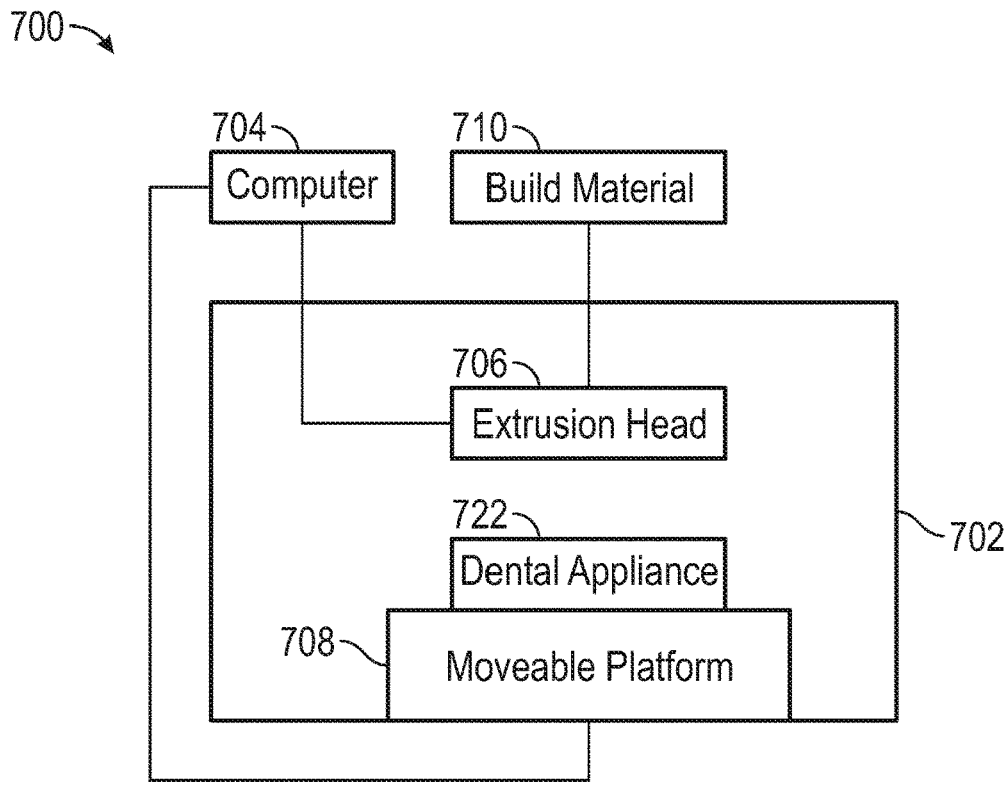
FIG. 8 is a block diagram illustrating an example computer-aided manufacturing system for construction of a removable dental appliance.

FIG. 8 is a block diagram illustrating an example computer-aided manufacturing system 700 for construction of removable dental appliance 722. Computer-aided manufacturing system 700 may include an additive manufacturing system 702 in communication with computer 704 and coupled to build material source 710. In some examples, computer-aided manufacturing system 700 may include computer-aided manufacturing system 84 of FIG. 7. For example, computer 704 may be the same as or substantially similar to computer 80. Build material source 710 may include a source of at least one polymeric material, such as, for example, at least one of the polymeric materials of appliance body 102 discussed above. Dental appliance 722 may be the same as or substantially similar to at least one of removable dental appliances 100, 200, and 300. In some examples, dental appliance 722 may include one dental appliance of set of dental appliances 22.

Additive manufacturing system 702 may include a moveable platform 708 and an extrusion head 706. Movable platform 708 and extrusion head 706 may be configured to manufacture dental appliance 722. For example, computer 704 may control extrusion head 706 and moveable platform 708 to manufacture removable dental appliance 722. Controlling, by computer 704, extrusion head 706 may include at least one of controlling a material feed rate from build material source 710 to extrusion head 706, controlling a deposition rate of build material on dental appliance 722, controlling a temperature of extrusion head 706, and controlling a position of extrusion head 706. By controlling at least one of a material feed rate, a material deposition rate, a temperature of extrusion head 706, and a position of extrusion head 710, computer 704 may control manufacture of a position, dimension, and shape of at least a portion of dental appliance 722. Controlling, by computer 704, moveable platform 708 may include at least one of controlling a translation of moveable platform in a plane normal to the direction of material deposition from extrusion head 706 and controlling an elevation of moveable platform along an axis substantially parallel to the direction of material deposition from extrusion head 706. By controlling at least one of a translation and elevation of moveable platform 708, computer 704 may control manufacture of a position, dimension, and shape of at least a portion of dental appliance 722.

Although FIG. 8 illustrates a computer-aided manufacturing system 700 configured for Fused Deposition Modeling (FDM), computer-aided manufacturing system 700 may also be configured for stereolithography (SLA), inverse vat polymerization additive manufacturing, inkjet et/polyjet additive manufacturing, or other methods of additive manufacturing. In examples in which computer-aided manufacturing system 700 is configured for polyjet printing, computer-aided manufacturing system 700 may be configured to print multiple materials in a single print, thereby allowing a high modulus material for the rigid components of dental appliance 722 (e.g., shells) and a low modulus or elastomeric material for the less rigid components of dental appliance 722 (e.g., spring bellows). Further, with polyjet additive manufacturing, the modulus may be varied selectively across the dental appliance 722, and a different modulus may be used for the spring bellows than is used for the shells, for different parts of a spring bellows, or for different parts of a shell, for example. Similarly, a different modulus may be used for the anchoring shells than is used for the shells used to reposition individual teeth.

Figure 9:
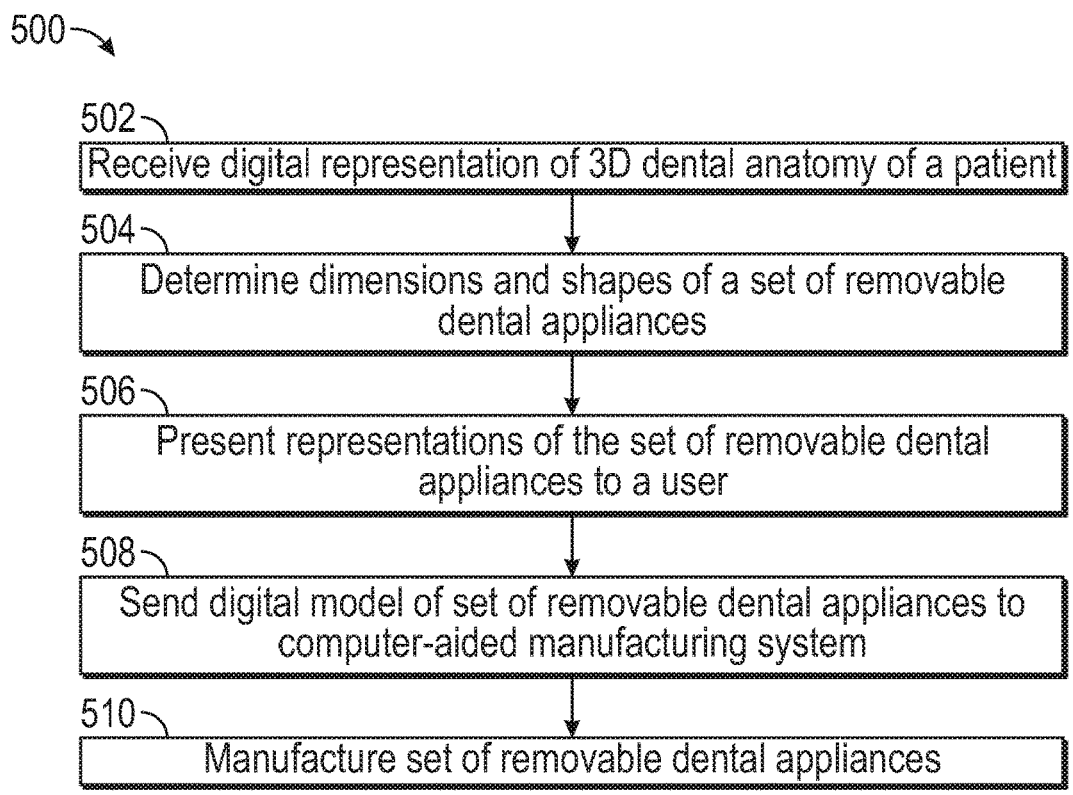
FIG. 9 is a flow diagram illustrating a process conducted at a manufacturing facility for construction of a set of removable dental appliances that include spring bellows.

FIG. 9 is a flow diagram illustrating process 500 conducted at manufacturing facility 20 for construction of set of removable dental appliances 22. In some examples, set of removable dental appliances 22 may include at least one of removable dental appliance 100, 200, and 300. Computer 80 at manufacturing facility 20 receives digital dental anatomy data 16 including initial positions of one or more teeth of the patient and prescription data 18 (502) from clinic 14. Alternatively, computer 80 may retrieve the information from a database located within or otherwise accessible by computer 80. A trained user associated with computer 80 may interact with a computerized modeling environment running on computer 80 to develop a treatment plan relative to the digital representation of the patient's tooth structure and generate prescription data 18, if clinic 14 has not already done so. In other examples, computer 80 may automatically develop a treatment plan based solely on the patient's tooth structure and predefined design constraints.

Once computer 80 receives patient's tooth structure, computer 80 determines dimensions and shapes of a removable dental appliance for the patient (504). The dimensions and shapes of the removable dental appliance are configured to reposition the one or more teeth of the patient from their initial positions to final positions when the removable dental appliance is worn by the patient. In the same or additional examples, computer 80 determines dimensions and shapes of set of removable dental appliances 22 for the patient configured to be worn in series.

In some examples, determining dimensions and shapes of the removable dental appliance includes selecting, with computer 80, the dimensions and shapes of the removable dental appliance according to a set of predefined design constraints. The set of predesigned design constraints may include one or more factors, including, but not limited to, at least one of a minimum and a maximum localized force applied to one or more of the surrounded teeth, at least one of a minimum and a maximum rotational force applied to one or more of the surrounded teeth, at least one of a minimum and a maximum translational force applied to one or more of the surrounded teeth, at least one of a minimum and a maximum total force applied to one or more of the surrounded teeth, and at least one of a minimum and a maximum stress or strain applied to the removable dental appliance, when the removable dental appliance is worn by the patient and the surrounded teeth are in their initial positions. Minimum applied forces are necessary to cause pressure on the periodontal ligament sufficient to result in bone remodeling and tooth movement.

Computer 80 may use finite element analysis (FEA) techniques to analyze forces on a patient's teeth as well as the removable dental appliance during the determination of the dimensions and shapes of the removable dental appliance. For example, computer 80 may apply FEA to a solid model of the patient's teeth as the modeled teeth move from their initial positions to their final positions representing a treatment including an ordered set of removable dental appliances. Computer 80 may use FEA to select the appropriate removable dental appliance to apply the desired forces on the teeth. In addition, computer 80 may use a virtual articulator to determine contact points between the teeth throughout the movement of the modeled teeth during the treatment. Computer 80 may further include occlusal contact forces, such as cusp interdigitation forces, in the FEA forces analysis in combination with forces from the removable dental appliance during the design of removable dental appliances in an ordered set of removable dental appliances. Computer 80 may further determine an order in which teeth are to be moved to optimize the application of forces, reduce treatment time, improve patient comfort, or the like.

In some examples, determining dimensions and shapes of removable dental appliance 100, 200, or 300 includes selecting, with computer 80 thicknesses of appliance body 102, 202, or 302, such as shells 104, 204, or 304 and spring bellows 108, 208, or 308, to provide a stiffness suitable to reposition the one or more teeth of the patient from their initial positions to final positions when the removable dental appliance is worn by the patient. In some examples, a thickness of a respective shell of shells 104 may range between about 0.25 millimeters and about 2.0 millimeters thick, such as between about 0.5 and about 1.0 millimeters thick, whereas a thickness of spring bellows 108 may be between about 0.025 millimeter and about 1.0 millimeters, or between about 0.1 millimeters and about 0.75 millimeters, or between about 0.15 and about 0.6 millimeters, or about 0.3 millimeters. In some examples, computer 80 may further select a material of the removable dental appliance, for example, a material as discussed above with respect to removable dental appliance 100, according to the predefined design constraints.

The dimensions and shapes of a removable dental appliance for the patient may be presented to a user via user interface of 82 of computer 80 (506). In examples in which dimensions and shapes of the removable dental appliance are presented to a user via user interface of 82, the user may have the opportunity to adjust the design constraints or directly adjust the dimensions and shapes of the removable dental appliance before the design data is sent to computer-aided manufacturing system 84. In some examples, the dimensions and shapes of the removable dental appliance may be presented to a user by computer 80 directly as the removable dental appliance is manufactured by computer-aided manufacturing system 84. For example, computer 80 may send a digital model of removable dental appliance 100 to computer-aided manufacturing system 84, and computer-aided manufacturing system 84 manufactures removable dental appliance according to the digital model from computer 80.

However, even in examples where the dimensions and shapes of a removable dental appliance for the patient may be presented to a user via user interface of 82 of computer 80, following user approval, computer 80 sends a digital model of the removable dental appliance to computer-aided manufacturing system 84 (508), and computer-aided manufacturing system 84 manufactures removable dental appliance 100 according to the digital model from computer 80 (510).

In some examples, computer-aided manufacturing system 84 may include a 3D printer. Forming appliance body (e.g., appliance body 102, 202, or 302) may include printing the surfaces of shells (e.g., shells 104, 204, or 304) and spring bellows (e.g., spring bellows 108, 208, or 308) with the 3D printer. In other examples, forming the appliance body may include printing representations of the patient's teeth (e.g., teeth 103) with the 3D printer, thermoforming appliance body over the representations of the patient's teeth, and trimming excess material (optionally automated by CNC or robotic machinery such as, e.g., end mill or LASER cutter) to form the shells, the spring bellows, and the shear reduction regions. The representations of the patient's teeth may include raised surfaces to facilitate forming at least one of the shells, the spring bellows, and shear reduction regions in the thermoformed and trimmed appliance body.

The techniques of FIG. 9 may be applied to design and manufacture of each of an ordered set of removable dental appliances 22. For example, each removable dental appliance in the ordered set of removable dental appliances 22 may be configured to incrementally reposition the teeth of the patient. In this manner, the ordered set of removable dental appliances 22 may be configured to reposition the teeth of the patient to a greater degree than any one of the removable dental appliances within the set of the removable dental appliances 22. Such an ordered set of removable dental appliances 22 may specifically be configured to incrementally reposition the one or more teeth of the patient from their initial positions to final positions as the removable dental appliances of the ordered set of removable dental appliances 22 for the patient are worn sequentially by the patient.

In some examples, the techniques described with respect to FIG. 9 may be embodied within a computer-readable storage medium, such as a computer-readable storage medium of computer 50, computer 80, or both. The computer-readable storage medium may store computer-executable instructions that, when executed, configure a processor to perform the techniques described with respect to FIG. 9.

Following the design of set of removable dental appliances 22, manufacturing facility 20 fabricates set of removable dental appliances 22 in accordance with the digital dental anatomy data 16 and prescription data 18 (510). Construction of removable dental appliances 22 may include 3D printing, thermoforming, injection molding, lost wax casting, 5-axis milling, laser cutting, hybrid plastic and metal manufacturing techniques, such as snap-fitting and overmolding, as well as other manufacturing techniques.

Figure 10:
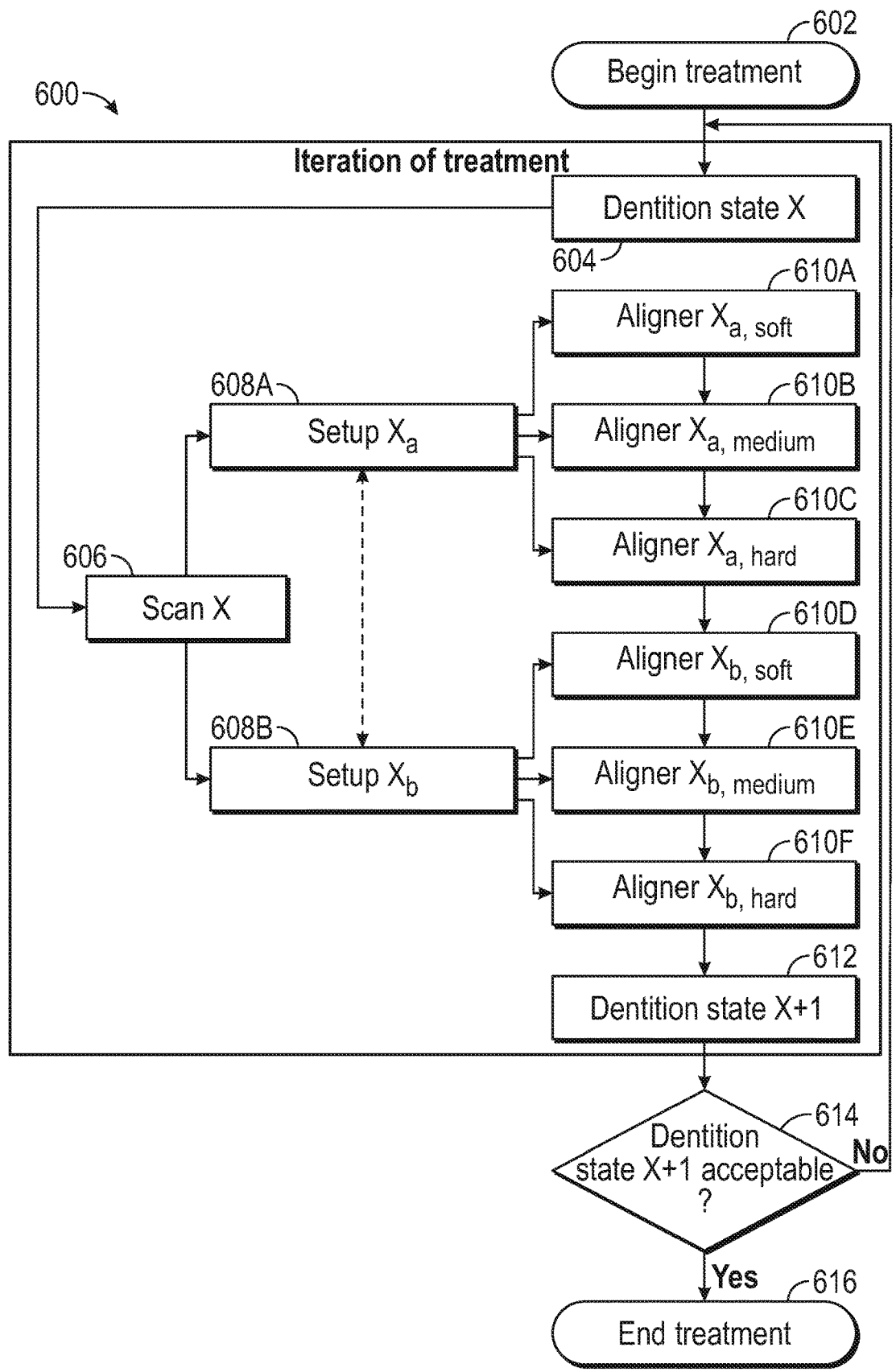
FIG. 10 is a flow diagram illustrating successive iterations of treatment using an ordered set of removable dental appliances that include spring bellows.

FIG. 10 is a flow diagram 600 illustrating successive iterations of treatment using an ordered set of removable dental appliances. The ordered set of removable dental appliances is configured to reposition one or more teeth of a patient. In some examples, the ordered set of removable dental appliances may include at least one of removable dental appliances 100, 200, and 300.

Treatment begins with the first iteration of treatment (602). At the beginning of the first iteration of treatment, the patient's teeth are at their initial positions as represented by detention state X (604). A scan of the patient's teeth, for example, as described above with respect to FIG. 5, are taken to facilitate the design of the ordered set of removable dental appliances (606). From the scan of patient's teeth, a computer, e.g., computer 50, determines two different shape and dimensions for removable dental appliances in the ordered set: first setup $X_a$ 608A and second setup $X_b$ 608B. Example techniques for creating a digital model of a patient's teeth are described in U.S. Pat. No. 8,738,165 to Cinader, et al., titled, "METHODS OF PREPARING A VIRTUAL DENTITION MODEL AND FABRICATING A DENTAL RETAINER THEREFROM," and issued on May 27, 2014. U.S. Pat. No. 8,738,165 is herein incorporated by reference in its entirety. The computer may determine first setup $X_a$ 608A and second setup $X_b$ 608B by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses, positions, shapes, and dimensions of shells and spring bellows of the removable dental appliances in the ordered set to produce the forces required to move the patient's teeth from the initial positions to their desired positions. The modeled forces applied by removable dental appliances in the ordered set may further be based on the incremental positional movements of the patient's teeth during the treatment. In this manner, the computer may design each of the removable dental appliances in the ordered set according to expected forces applied on the teeth in the predicted positions of the teeth at the time during the treatment the removable dental appliances in the ordered set is to be worn by the patient.

In some examples, at least one, such as three, different removable dental appliances in the set of removable dental appliances can be manufactured using each of first setup $X_a$ 608A and second setup $X_b$ 608B to produce at least two, such as six, removable dental appliances in the set of removable dental appliances. For example, first setup $X_a$ 608A may be used to manufacture first aligner $X_{a,\ SOFT}$ 610A, second aligner $X_{a,\ MEDIUM}$ 610B, and third aligner $X_{a,\ HARD}$ 610C; and second setup $X_b$ 608B may be used to manufacture fourth aligner $X_{b,\ SOFT}$ 610D, fifth aligner $X_{b,\ MEDIUM}$ 610E, and sixth aligner $X_{b,\ HARD}$ 610F. First, second, and third aligners 610A to 610C may be substantially the same shape and dimensions, but may comprise materials with different stiffness characteristics. For example, the second and third aligners 610B and 610C may have higher stiffness characteristics than first aligner 610A, and third aligner 610C may have higher stiffness characteristics than second aligner 610B. Similarly, the fourth, fifth, and sixth aligners 610D to 610F may be substantially the same shape and dimensions, but comprise materials with different stiffness characteristics. In some examples, first aligner 610A may have the same stiffness characteristics as the fourth aligner 610D, such as a relatively soft polymeric material. Similarly, second aligner 610B may have the same stiffness characteristics as the fifth aligner 610E, such as a relatively stiffer polymeric material than first aligner 610A. Likewise, third aligner 610C may have the same stiffness characteristics as the sixth aligner 610F, such as a relatively stiffer polymeric material than second aligner 610B.

Aligners 610A to 610F in the ordered set of removable dental appliances may be worn in sequence over time by the patient. For example, each of aligners 610A to 610F in the ordered set of removable dental appliances may be worn between about 1 weeks and about 6 weeks, such as between about 2 weeks and about 4 weeks, or about 3. Following the treatment plan using aligners 610A to 610F, the patient's teeth may be at their final positions for the first iteration of treatment as represented by detention state X+1 (612).

Once patient's teeth are at or near dentition state X+1, the patient may return to the clinician who may evaluate the result of the first iteration of treatment (614). If the first iteration of treatment has resulted in acceptable final positions of the patient's teeth, then the treatment may be ended (616). However, if the first iteration of treatment did not result in acceptable final positions of the patient's teeth, one or more additional iterations of treatment may be performed. To begin the next iteration of treatment, the clinician may take another scan of the patient's teeth to facilitate the design of a subsequent ordered set of removable dental appliances (606). In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of FIG. 10 represent one specific example, and a variety of modifications may be made to the techniques of FIG. 10 within the spirit of this disclosure. For example, an ordered set of removable dental appliances may include more or less than six removable dental appliances. As another example, each removable dental appliance in the ordered set of removable dental appliances may have unique shapes and dimensions, and each removable dental appliance in the ordered set of removable dental appliances may be made of material having substantially the same or similar stiffness characteristics. As another example, each removable dental appliance in the ordered set of removable dental appliances may include a selected thickness of the spring bellows. For example, first aligner $X_{a,\ SOFT}$ 610A, second aligner $X_{a,\ MEDIUM}$ 610B, and third aligner $X_{a,\ HARD}$ 610C may be a first thickness of the spring bellows; whereas fourth aligner $X_{b,\ SOFT}$ 610D, fifth aligner $X_{b,\ MEDIUM}$ 610E, and sixth aligner $X_{b,\ HARD}$ 610F may be a second, different thickness of the spring bellows. The first thickness may be less than the second thickness. As another example, each removable dental appliance in the ordered set of removable dental appliances may include selected dimensions of one or more spring bellows, selected shapes of one or more spring bellows, or both.

EXAMPLES

Figure 11A:
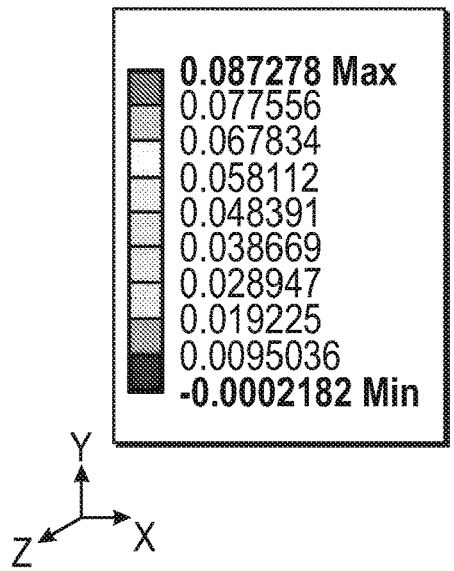
FIGS. 11A and 11B illustrate a directional deformation diagram and an equivalent stress diagram for a modeled removable dental appliance that does not include spring bellows.
Figure 11A:
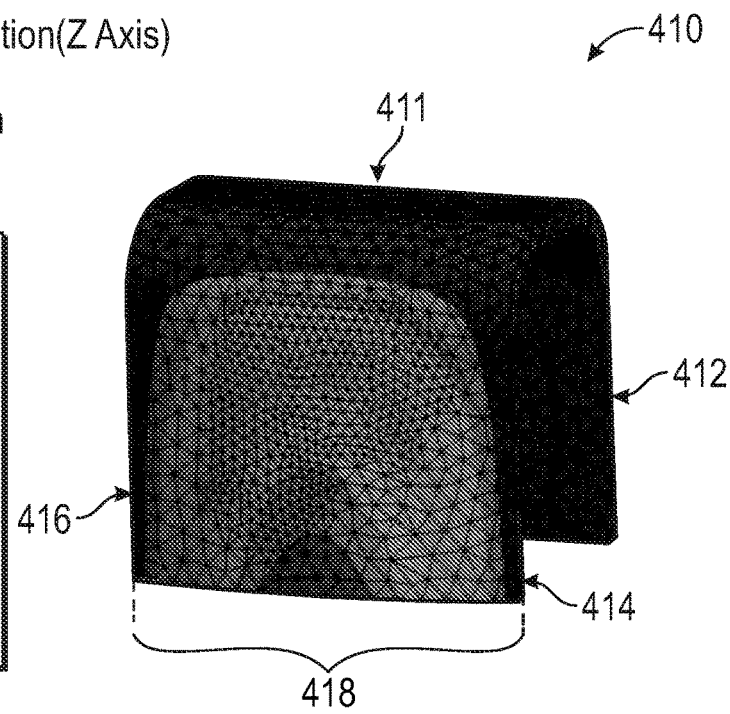
Figure 11B:
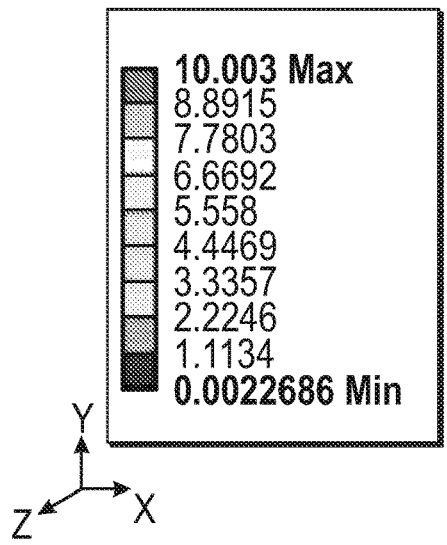
Figure 11B:
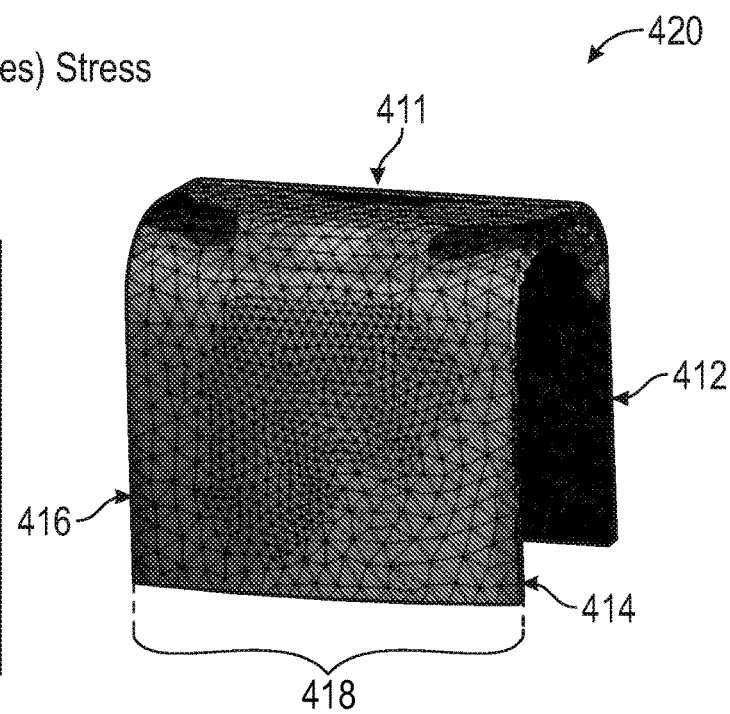

FIGS. 11A and 11B illustrate a directional deformation diagram 410 and an equivalent stress diagram 420 for a modeled shell 411 of a removable dental appliance that does not include spring bellows. FIGS. 11A and 11B show the lingual surface 412 and facial surface 414 of shell 411 of a removable dental appliance without spring bellows. For purposes of modeling, edge 416 of facial surface 414 was fixed along the x-axis, y-axis, and z-axis, and the other three vertical edges of the shell were fixed along the z-axis. Deformation of shell 411 was modeled with a 2 Newton (204 gram) force applied to the center of the inside facial surface 414 in the facial direction. Shell 411 material was modeled as DURAN, available from Scheu Dental, Iserlohn, Germany, with an elastic modulus of approximately 2200 MPa. The modeled removable dental appliance included a nominal shell 411 thickness of 0.50 millimeters. The maximum strain was 0.53%. As shown in FIG. 11A, deformation in the z-axis was distributed across face 418 of facial surface 414. As shown in FIG. 11B, stress was distributed across face 418 of facial surface 414. The examples of FIGS. 11A and 11B show that without spring bellows stress and deformation of a removable dental appliance when worn by a patient is distributed across the shells of the removable dental appliance. As discussed above, distribution of deformation and stress in the shells may not be desirable because it may reduce engagement of the shells with the respective teeth, reducing control of the movement of the teeth.

Figure 12A:
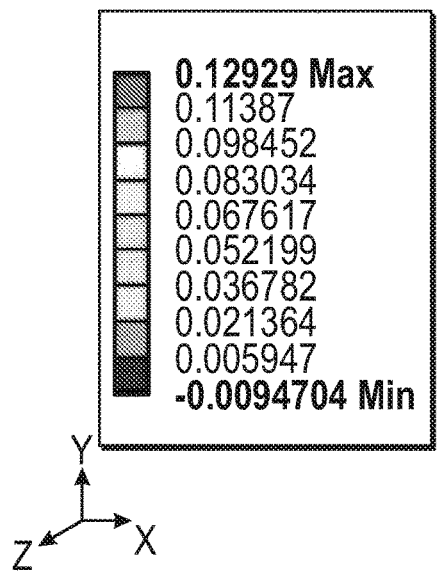
FIGS. 12A and 12B illustrate a directional deformation diagram and an equivalent stress diagram for a modeled removable dental appliance that includes spring bellows.
Figure 12A:
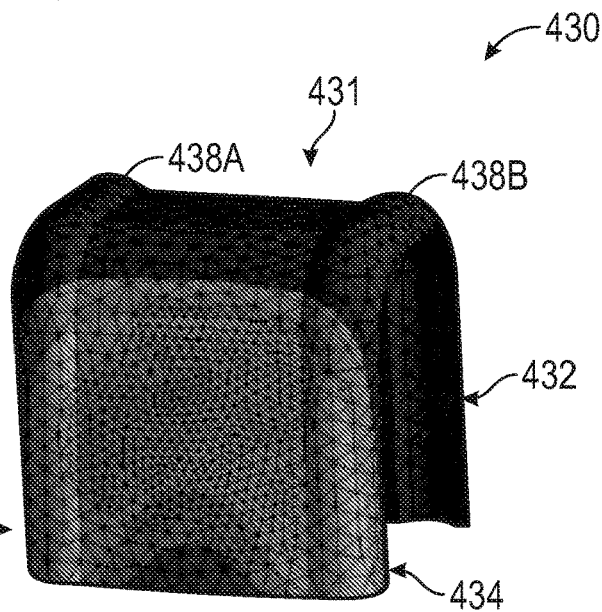
Figure 12B:
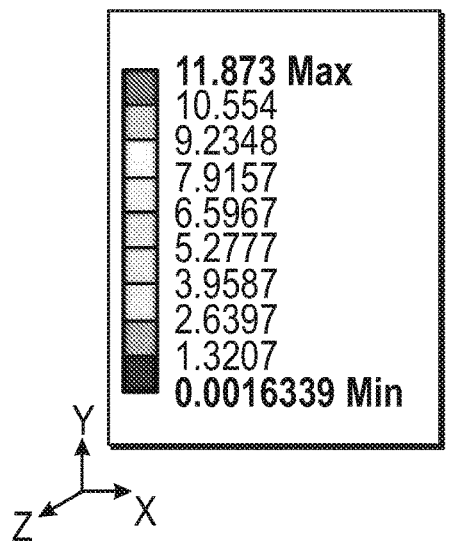
Figure 12B:
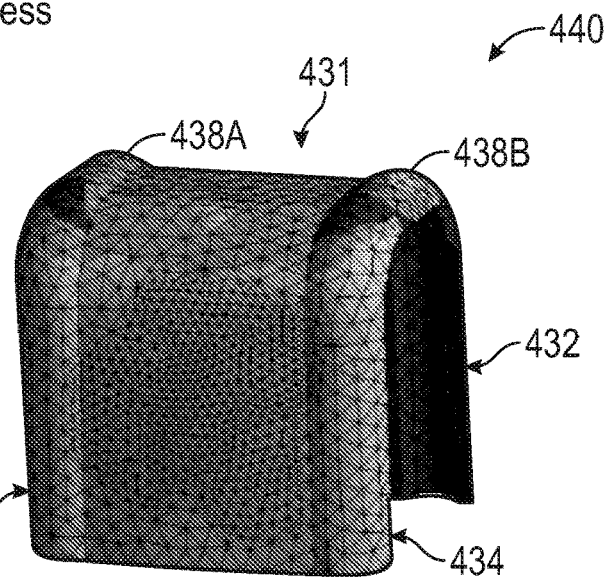

FIGS. 12A and 12B illustrate a directional deformation diagram and an equivalent stress diagram for a modeled shell 431 of a removable dental appliance that includes spring bellows 438A and 438B. FIGS. 12A and 12B show the lingual surface 432 and facial surface 434 of an example shell 431 of a removable dental appliance with spring bellows 438A and 438B (e.g., removable dental appliance 100 or 200). For purposes of modeling, vertical edge 436 of spring bellows 438A was fixed along the x-axis, y-axis, and z-axis, and the other three vertical edges of the shell were fixed along the z-axis. Deformation of shell 431 was modeled with a 2 Newton (204 gram) force applied to the center of the inside facial surface 434 in the facial direction. Shell 431 material was modeled as DURAN, available from Scheu Dental, Iserlohn, Germany, with an elastic modulus of approximately 2200 MPa. The modeled removable dental appliance included a nominal shell 431 thickness of 0.50 millimeters, and a nominal spring bellows 438A and 438B thickness of 0.30 millimeters. The maximum strain was 0.54%. As shown in FIG. 12A, deformation in the z-axis is concentrated in spring bellows 438A and 438B and reduced across the face of facial surface 434 compared to FIG. 11A. Also, the maximum magnitude of the directional deformation of facial surface 434 along the z-axis increased, indicating the removable dental appliance could move a tooth farther compared to the appliance shown in FIG. 11. As shown in FIG. 12B, stress is concentrated in spring bellows 438A and 438B and is reduced across the face of facial surface 434 compared to FIG. 11B. The example of FIGS. 5A and 5B show that spring bellows may reduce stress and deformation of the shells compared to a removable dental appliance without spring bellows. The reduction in stress and deformation of the shells compared to a removable dental appliance without spring bellows may be more pronounced if the shells were made thicker and the spring bellows made thinner. As discussed above, reducing of the deformation in the shells is desirable, because it may increase engagement of the shells with the respective teeth to improve control of the movement of the teeth.

Figure 13A:
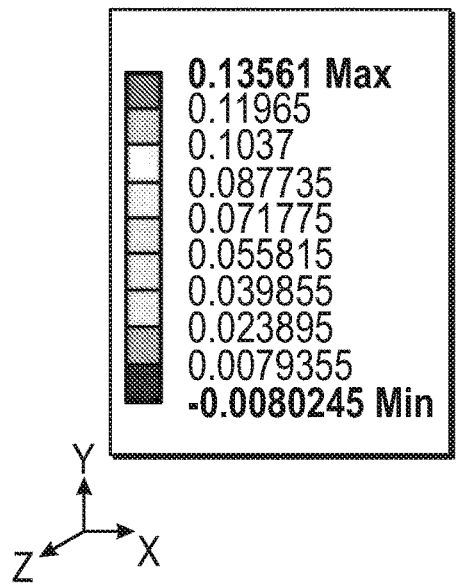
FIGS. 13A and 13B illustrate a directional deformation diagram and an equivalent stress diagram for a modeled removable dental appliance that includes spring bellows and shear reduction regions.
Figure 13A:
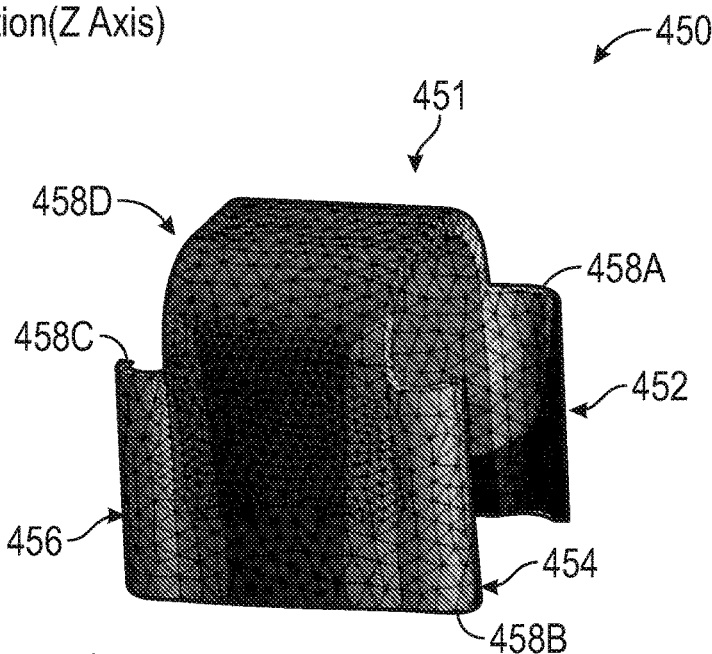
Figure 13B:
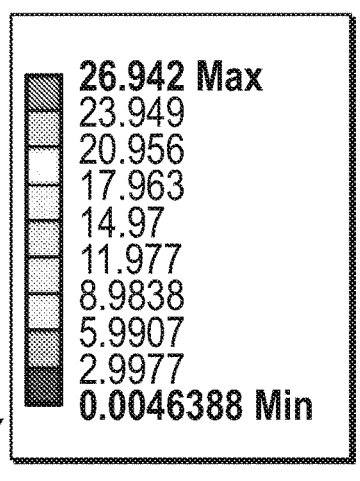
Figure 13B:
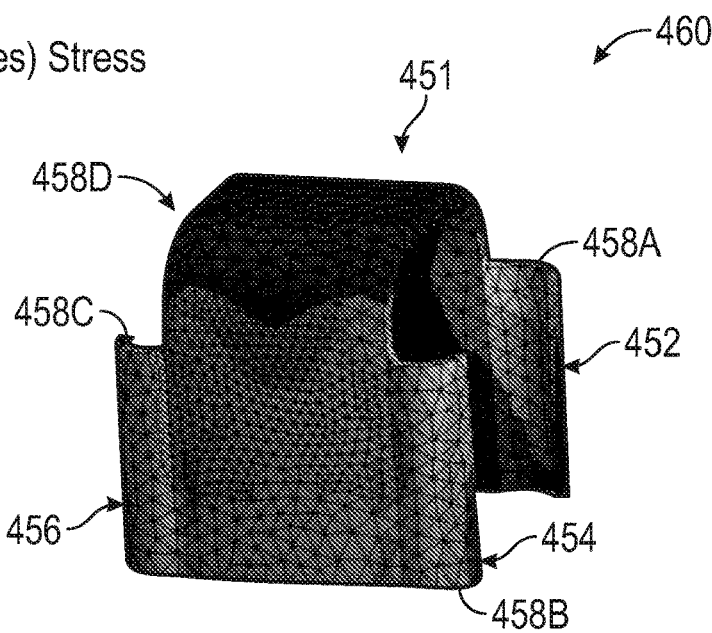

FIGS. 13A and 13B illustrate a directional deformation diagram 450 and an equivalent stress diagram 460 for a modeled shell 451 of a removable dental appliance that includes spring bellows 458A-458D defining shear reduction regions (e.g., removable dental appliance 300). FIGS. 13A and 13B show the lingual surface 452 and facial surface 454 of shell 451 of a removable dental appliance with spring bellows 458A-458D defining shear reduction regions. The shear reduction regions may include a void in the appliance body extending along shell 451 between each of spring bellows 458A and 458B, and spring bellows 458C and 458D. For purposes of modeling, vertical edge 456 of spring bellows 458C was fixed along the x-axis, y-axis, and z-axis, and the other three vertical edges of the shell were fixed along the z-axis. Deformation of shell 451 was modeled with a 2 newton (204 gram) force applied to the center of the inside facial surface 454 in the facial direction. Shell 451 material was modeled as DURAN, available from Scheu Dental, Iserlohn, Germany, with an elastic modulus of approximately 2200 MPa. The modeled removable dental appliance included a nominal shell 451 thickness of 0.50 millimeters, and a nominal spring bellows 458A-458D thickness of 0.30 millimeters. The maximum strain was 1.23%. As shown in FIG. 13A, deformation in the z-axis is concentrated in spring bellows 458A-458D and reduced across the face of facial surface 454 compared to FIGS. 11A and 12A. As shown in FIG. 13B, stress is concentrated in spring bellows 458A-458D and is reduced across the face of facial surface 454 compared to FIGS. 11B and 12B. The example of FIGS. 13A and 13B show that spring bellows with shear reduction regions may reduce stress and deformation of the shell compared to a removable dental appliance without spring bellows, or a removable dental appliance with spring bellows but without shear reduction regions. As discussed above, reducing of the deformation in the shells is desirable, because it may increase engagement of the shells with the respective teeth to improve control of the movement of the teeth.

Various examples have been described. These and other examples are within the scope of the following claims.

What is claimed is:

1. A removable dental appliance comprising:
    an appliance body configured to at least partially surround two or more teeth of a patient, wherein the appliance body comprises:
        a first shell shaped to receive a first tooth of the patient;
        a second shell shaped to receive a second tooth of the patient; and
    at least one spring bellows comprising an arcuate displacement of the appliance body extending over and away from at least a portion of an interproximal region between the first tooth and the second tooth to join the first shell and the second shell, wherein the at least one spring bellows is configured to apply a force between the first shell and the second shell to cause movement of at least one of the first tooth and the second tooth toward a desired position when the removable dental appliance is worn by the patient,
    wherein the arcuate displacement comprises an outer radius of curvature between about 0.5 millimeters and about 2 millimeters.

2. The removable dental appliance of claim 1, wherein the at least one spring bellows overlaps at least a portion of the gingival margin.

3. The removable dental appliance of claim 1, wherein a thickness of the at least one spring bellows is less than a thickness of the first and second shells to at least one of concentrate strain in the at least one spring bellows or reduce deformation of the first shell and the second shell when the removable dental appliance is worn by the patient.

4. The removable dental appliance of claim 1, wherein a thickness of the at least one spring bellows is between about 0.025 millimeters and about 1.0 millimeter, and the thickness of the first and second shells is between about 0.25 millimeters and about 2.0 millimeters.

5. The removable dental appliance of claim 1, wherein the arcuate displacement comprises a displacement distance extending between a midline of the interproximal surface and a midline of the arcuate displacement, and wherein the displacement distance is no greater than 2 millimeters.

6. The removable dental appliance of claim 1, wherein at least a portion of an edge of the at least one spring bellows joins at least a portion of an edge of the first shell at a first intersection.

7. The removable dental appliance of claim 1, wherein at least one spring bellows defines a shear reduction region.

8. The removable dental appliance of claim 7, wherein the shear reduction region comprises at least one cutout in the at least one spring bellows.

9. The removable dental appliance of claim 1, wherein the at least one spring bellows extends around at least a portion of at least one of a cervical margin or a gingival margin of at least one of the first tooth or the second tooth.

10. The system of claim 1, wherein the appliance body comprises a unitary three-dimensionally printed polymeric material.

11. A system comprising:
an ordered set of removable dental appliances configured to reposition one or more teeth of a patient, each removable dental appliance in the set of removable dental appliances comprising a respective appliance body configured to at least partially surround two or more teeth of the patient, wherein each respective appliance body comprises:
a first shell shaped to receive a first tooth of the patient;
a second shell shaped to receive a second tooth of the patient; and
at least one spring bellows comprising an arcuate displacement of the appliance body extending over and away from at least a portion of an interproximal region between the first tooth and the second tooth to join the first shell and the second shell, wherein the at least one spring bellows is configured to apply a force between the first shell and the second shell to cause movement of at least one of the first tooth and the second tooth toward a desired position when the removable dental appliance is worn by the patient,
wherein the arcuate displacement comprises an outer radius of curvature between about 0.5 millimeters and about 2 millimeters.

12. The system of claim 11, wherein the at least one spring bellows overlaps at least a portion of the gingival margin.

13. The system of any one of claim 11, wherein a thickness of the at least one spring bellows is less than a thickness of the first and second shells to at least one of concentrate strain in the at least one spring bellows or reduce deformation of the first shell and the second shell when the removable dental appliance is worn by the patient.

14. The system of claim 11, wherein the arcuate displacement comprises an outer radius of curvature between about 0.5 millimeters and about 2 millimeters.

15. The system of claim 14, wherein the outer radius of curvature either is substantially constant along an interproximal boundary curve extending from the lingual gingiva along the interproximal region to the facial gingiva, or varies along an interproximal boundary curve extending from the lingual gingiva along the interproximal region to the facial gingiva.

16. A method comprising:
receiving, by a computing device, a digital representation of a three-dimensional (3D) dental anatomy of a patient, the dental anatomy providing initial positions of one or more teeth of the patient;
determining, by the computing device, dimensions and shapes of a removable dental appliance for the patient, wherein:
the removable dental appliance comprises an appliance body configured to at least partially surround two or more teeth of the patient,
the dimensions and shapes of the removable dental appliance are configured to reposition the one or more teeth of the patient from initial positions to desired positions when the removable dental appliance is worn by the patient, and
the dimensions and shapes of the removable dental appliance comprise:
a position, dimension and shape of a first shell shaped to receive a first tooth of the patient;
a position, dimension and shape of a second shell shaped to receive a second tooth of the patient;
a position, dimension, and shape of at least one spring bellows comprising an arcuate displacement of the appliance body extending over and away from at least a portion of an interproximal region between the first tooth and the second tooth to join the first shell and the second shell, wherein the at least one spring bellows is configured to apply a force between the first shell and the second shell to cause movement of at least one of the first tooth and the second tooth toward a desired position when the removable dental appliance is worn by the patient wherein the arcuate displacement comprises an outer radius of curvature between about 0.5 millimeters and about 2 millimeters; and
transmitting, by the computing device, a representation of the removable dental appliance to a computer-aided manufacturing system.

17. The method of claim 16, wherein the removable dental appliance comprises an aligning tray.

18. The method of claim 16, wherein the three-dimensional (3D) dental anatomy of the patient further includes at least some portion of tooth roots, gingiva, periodontal ligaments (PDL), alveolar bone, or cortical bone.

19. The method of claim 16, further comprising:
determining, by the computing device, dimensions and shapes of each of an ordered set of a removable dental appliances for the patient, the removable dental appliance being one of the ordered set of removable dental appliances for the patient,
wherein each removable dental appliance in the ordered set of removable dental appliances is configured to incrementally reposition the teeth of the patient to a more advanced position than any one of the earlier removable dental appliances within the set of the removable dental appliances.

20. The method of claim 16, wherein determining, by the computing device, dimensions and shapes of the removable dental appliance includes selecting, by the computing device, the dimensions and shapes of the removable dental appliance according to a set of predefined design constraints, the set of predefined design constraints including one or more of a group consisting of:
a minimum and a maximum localized force applied to one or more of the surrounded teeth, the first shell, or the second shell;
a minimum and a maximum rotational force applied to one or more of the surrounded teeth, the first shell, or the second shell;
a minimum and a maximum translational force applied to one or more of the surrounded teeth, the first shell, or the second shell;
a minimum and a maximum total force applied to one or more of the surrounded teeth, the first shell, or the second shell; and
a minimum and a maximum strain applied to the removable dental appliance when worn by the patient.

* * * * *